United States Patent
Takano

(10) Patent No.: US 10,862,564 B2
(45) Date of Patent: Dec. 8, 2020

(54) BASE STATION, TERMINAL APPARATUS, METHOD AND RECORDING MEDIUM

(71) Applicant: Sony Corporation, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/468,296

(22) PCT Filed: Nov. 16, 2017

(86) PCT No.: PCT/JP2017/041217
§ 371 (c)(1),
(2) Date: Jun. 11, 2019

(87) PCT Pub. No.: WO2018/123326
PCT Pub. Date: Jul. 5, 2018

(65) Prior Publication Data
US 2019/0349063 A1 Nov. 14, 2019

(30) Foreign Application Priority Data
Dec. 26, 2016 (JP) ................ 2016-251908

(51) Int. Cl.
H04B 7/06 (2006.01)
H04B 17/24 (2015.01)
(Continued)

(52) U.S. Cl.
CPC ........... H04B 7/0695 (2013.01); H04B 17/24 (2015.01); H04L 5/0051 (2013.01); H04W 24/10 (2013.01);
(Continued)

(58) Field of Classification Search
CPC ... H04B 7/00; H04B 7/02; H04B 7/06; H04B 7/063; H04B 7/0452; H04B 7/0695;
(Continued)

(56) References Cited

U.S. PATENT DOCUMENTS

| 8,379,750 B2* | 2/2013 | Hoshino | H04B 7/0408 375/267 |
| 2013/0217404 A1* | 8/2013 | Jung | H04W 48/20 455/452.1 |

(Continued)

FOREIGN PATENT DOCUMENTS

JP 2014-527370 A 10/2014

OTHER PUBLICATIONS

International Search Report and Written Opinion dated Feb. 13, 2018 for PCT/JP2017/041217 filed on Nov. 16, 2017, 9 pages including English Translation of the International Search Report.
(Continued)

Primary Examiner — Shawkat M Ali
(74) Attorney, Agent, or Firm — Xsensus LLP

(57) ABSTRACT

A base station includes a selection unit configured to select a second beam appropriate for communication with a terminal apparatus on a basis of reception results of a plurality of second reference signals transmitted or received using a plurality of the second beams having irradiation ranges obtained by subdividing an irradiation range of a first beam which is appropriate for communication with the terminal apparatus and which is selected on a basis of reception results of a plurality of first reference signals transmitted using a plurality of the first beams which are formed by a plurality of antennas and which are set in advance; and a notification unit configured to notify the terminal apparatus of information indicating arrangement relationship between respective pluralities of first and second resources corresponding to pluralities of the first and second beams for the first and second reference signals.

18 Claims, 28 Drawing Sheets

(51) Int. Cl.
  *H04L 5/00* (2006.01)
  *H04W 24/10* (2009.01)
  *H04W 28/02* (2009.01)
(52) U.S. Cl.
  CPC ....... *H04W 28/0215* (2013.01); *H04B 7/0617* (2013.01)
(58) Field of Classification Search
  CPC ......... H04B 17/24; H04L 5/00; H04L 5/0051; H04L 25/02; H04W 16/28; H04W 24/00; H04W 24/10; H04W 28/02; H04W 28/0215; H04W 72/04; H04W 72/08
  USPC ........ 370/310; 375/219, 260, 267, 295, 316; 455/101, 132, 452.1, 517
  See application file for complete search history.

(56) References Cited

U.S. PATENT DOCUMENTS

| | | | |
|---|---|---|---|
| 2017/0230875 A1* | 8/2017 | Tavildar | H04W 36/08 |
| 2017/0257230 A1* | 9/2017 | Son | H04B 7/0695 |
| 2018/0115355 A1* | 4/2018 | Nagata | H04B 7/0621 |

OTHER PUBLICATIONS

CATT, "Design of beam training", 3GPP TSG RAN WG1 Meeting No. 86bis R1-1608774, Lisbon, Portugal Oct. 10-14, 2016, 6 pages.
Huawei et al., "Beam Management Procedure for NR MIMO", 3GPP TSG RAN WG1 Meeting No. 86 R1-166089, Gothenburg, Sweden, Aug. 22-26, 2016, 6 pages.
Intel Corporation: Beam management for initial and candidate beam discovery (BM P-I) 3GPP Draft; RI-1609516 Beam Management; P1_Draft V6, 3rd Generation Partnership Project (3GPP), vol. RAN WG1, No. Lisbon, Portugal; Oct. 10, 2016-Oct. 14, 2016 Oct. 9, 2016 (Oct. 9, 2016), XP051149555.
Huawei et al: "Views on UL based mobility", 3GPP Draft; RI-1611249, 3rd Generation Partnership Project (3GPP), Mobile Competence Centre ; 650, Route Des Lucioles ; F-06921 Sophia-Ntipolis Cedex ; France vol. RAN WG1, No. Reno, USA; Nov. 14, 2016-Nov. 18, 2016, Nov. 5, 2016 (Nov. 5, 2016), XP051189821.
Huawei et al: "Reference Signal design for UL based measurement, CSI acquisition, and beam management", 3GPP Draft; RI-1609413, 3rd Generation Partnership Project (3GPP), vol. RAN WG1, No. Lisbon, Portugal; Oct. 10, 2016-Oct. 14, 2016 Oct. 9, 2016 (Oct. 9, 2016), XP051149456.
Extended European Search Report dated Oct. 1, 2019 in European Application No. 17887889.8-1220.

* cited by examiner

(12) United States Patent

BASE STATION, TERMINAL APPARATUS, METHOD AND RECORDING MEDIUM

CROSS-REFERENCE TO RELATED APPLICATIONS

The present application is based on PCT filing PCT/JP2017/041217, filed Nov. 16, 2017 which claims priority to JP 2016-251908, filed Dec. 26, 2016, the entire contents of each are incorporated herein by reference.

TECHNICAL FIELD

The present disclosure relates to a base station, a terminal apparatus, a method and a recording medium.

BACKGROUND ART

In recent years, 5G which is a next generation communication standard has been discussed in the Third Generation Partnership Project (3GPP). Communication technology constituting 5G is also called New Radio Access Technology (NR).

There is multiple-input and multiple-output (MIMO) as one of the techniques constituting the NR. MIMO is a technique for performing beam forming using a plurality of antennas, and includes 3D (or full dimension)-MIMO capable of performing beam forming in three-dimensional directions, massive-MIMO using a plurality of antennas, and the like. In MIMO, it is desired to improve a beam association technique for selecting a beam appropriate for a terminal apparatus.

For example, the following Non-Patent Literature 1 discloses a technique of selecting a beam by performing stepwise beam sweeping of beam sweeping using a rough beam and beam sweeping using an accurate beam.

CITATION LIST

Non-Patent Literature

Non-Patent Literature 1: CATT, "Design of beam training", [online], October, 2016, 3GPP TDocs (written contributions) at meeting. Meeting: R1-86b—2016 Oct. 10 to 2016 Oct. 14, Lisbon, [Retrieved on Dec. 7, 2016], Internet <URL: http://www.3gpp.org/ftp/TSG_RAN/WG1-RL1/TSGR1_86b/Docs/R1-1608774.zip>

DISCLOSURE OF INVENTION

Technical Problem

However, while the technique disclosed in the above-described Non-Patent Literature enables efficient beam selection, power consumption of a terminal apparatus has not been sufficiently studied.

Therefore, the present disclosure proposes a mechanism which enables both efficient beam selection and reduction of power consumption of a terminal apparatus.

Solution to Problem

According to the present disclosure, there is provided a base station including: a selection unit configured to select a second beam appropriate for communication with a terminal apparatus on the basis of reception results of a plurality of second reference signals transmitted or received using a plurality of the second beams having irradiation ranges obtained by subdividing an irradiation range of a first beam which is appropriate for communication with the terminal apparatus and which is selected on the basis of reception results of a plurality of first reference signals transmitted using a plurality of the first beams which are formed by a plurality of antennas and which are set in advance; and a notification unit configured to notify the terminal apparatus of information indicating arrangement relationship between a plurality of first resources corresponding to a plurality of the first beams for the first reference signals and a plurality of second resources corresponding to a plurality of the second beams for the second reference signals.

In addition, according to the present disclosure, there is provided a terminal apparatus including: an acquisition unit configured to acquire, from a base station which selects a second beam appropriate for communication with the terminal apparatus on the basis of reception results of a plurality of the second reference signals transmitted or received using a plurality of the second beams having irradiation ranges obtained by subdividing an irradiation range of a first beam appropriate for communication with the terminal apparatus selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals, and a selection support unit configured to perform processing for supporting selection of the second beam by the base station on the basis of the information indicating the arrangement relationship.

In addition, according to the present disclosure, there is provided a method to be executed by a processor, the method including: selecting a second beam appropriate for communication with a terminal apparatus on the basis of reception results of a plurality of second reference signals transmitted or received using a plurality of the second beams having irradiation ranges obtained by subdividing an irradiation range of a first beam appropriate for communication with the terminal apparatus, selected on the basis of reception results of a plurality of first reference signals transmitted using a plurality of the first beams which are formed by a plurality of antennas and which are set in advance; and notifying the terminal apparatus of information indicating arrangement relationship between a plurality of first resources corresponding to a plurality of the first beams for the first reference signals and a plurality of second resources corresponding to a plurality of the second beams for the second reference signals.

In addition, according to the present disclosure, there is provided a method to he executed by a processor, the method including: acquiring, from a base station which selects a second beam appropriate for communication with a terminal apparatus on the basis of reception results of a plurality of the second reference signals transmitted or received using a plurality of the second beams having irradiation ranges obtained by subdividing an irradiation range of a first beam appropriate for communication with the terminal apparatus, selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals, and performing processing for supporting selection of the second beam by the base station on the basis of the information indicating the arrangement relationship.

In addition, according to the present disclosure, there is provided a recording medium in which a program is recorded, the program being a program for causing a computer to function as: a selection unit configured to select a second beam appropriate for communication with a terminal apparatus on the basis of reception results of a plurality of second reference signals transmitted or received using a plurality of the second beams having irradiation ranges obtained by subdividing an irradiation range of a first beam appropriate for communication with the terminal apparatus, selected on the basis of reception results of a plurality of first reference signals transmitted using a plurality of the first beams which are formed by a plurality of antennas and which are set in advance; and a notification unit configured to notify the terminal apparatus of information indicating arrangement relationship between a plurality of first resources corresponding to a plurality of the first beams for the first reference signals and a plurality of second resources corresponding to a plurality of the second beams for the second reference signals.

In addition, according to the present disclosure, there is provided recording medium in which a program is recorded, the program being a program for causing a computer to function as: an acquisition unit configured to acquire, from a base station which selects a second beam appropriate for communication with a terminal apparatus on the basis of reception results of a plurality of the second reference signals transmitted or received using a plurality of the second beams having irradiation ranges obtained by subdividing an irradiation range of a first beam appropriate for communication with the terminal apparatus, selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals, and a selection support unit configured to perform processing for supporting selection of the second beam by the base station on the basis of the information indicating the arrangement relationship.

According to the present disclosure, a base station can efficiently select a beam by performing stepwise beam association. Further, a terminal apparatus can reduce power consumption of the terminal apparatus by performing processing for supporting second beam selection at the base station on the basis of information indicating arrangement relationship between a first resource and a second resource.

Advantageous Effects of Invention

According to the present disclosure as described above, a mechanism which enables both efficient beam selection and reduction of power consumption of a terminal apparatus is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
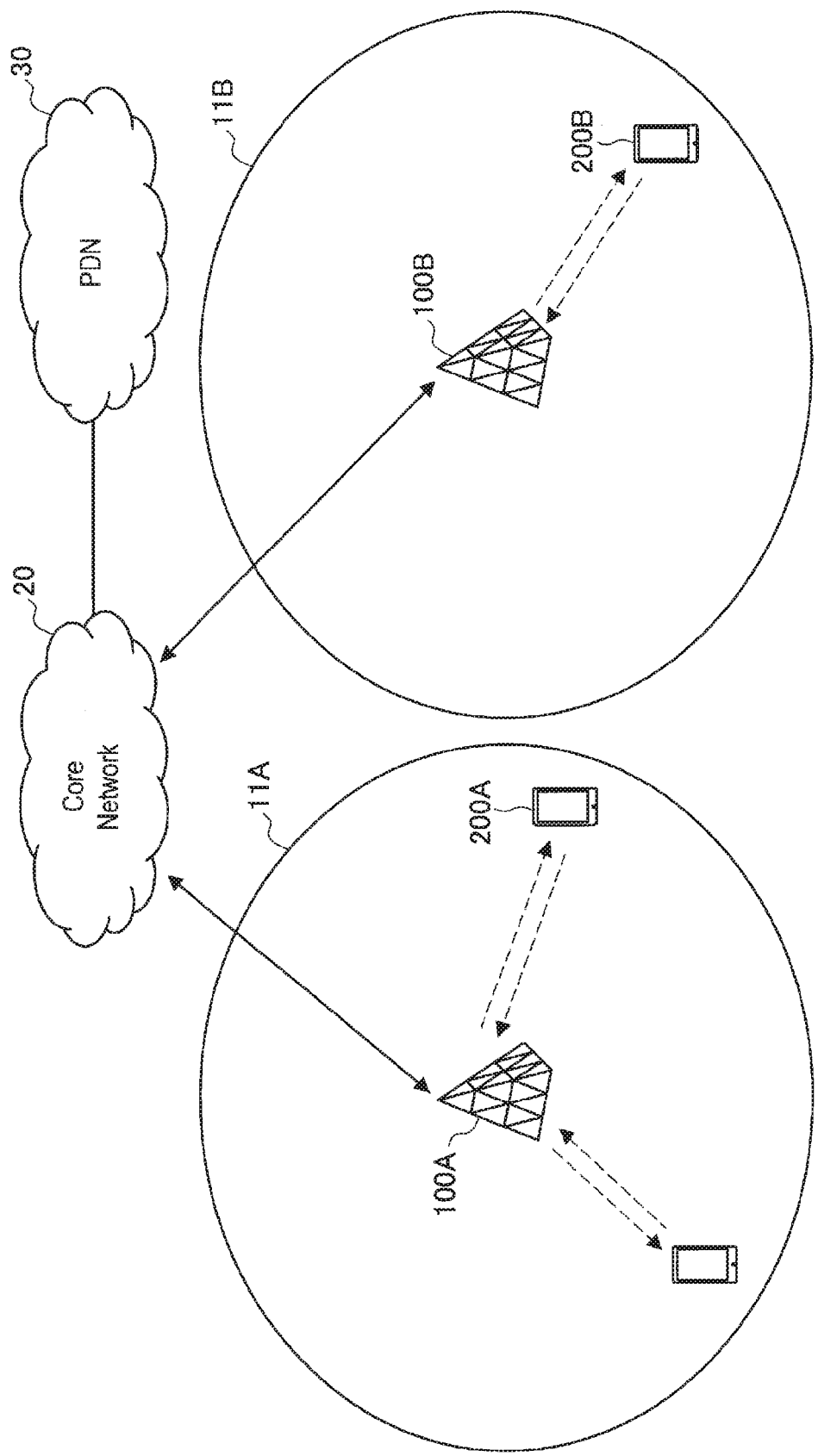
FIG. 1 is a diagram illustrating an example of an entire configuration of a system according to an embodiment of the present disclosure.

Hereinafter, preferred embodiments of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as base stations 100A, 100B, and 100C as appropriate. On the other hand, when not particularly distinguishing each of multiple elements having substantially the same function and structure, only the same sign will be given. For example, the base stations 100A, 100B, and 100C will he simply designated the base stations 100 when not being particularly distinguished.

Note that description will be provided in the following order.
1. Introduction
1.1. Entire configuration
1.2. Techniques relating to beam forming
2. Configuration example of each apparatus
2.1. Configuration example of base station
2.2. Configuration example of terminal apparatus
3. First embodiment
3.1. Technical problems
3.2. Technical features
4. Second embodiment
4.1. Technical problems
4.2. Technical features
5. Application examples
6. Conclusion

1. Introduction

<1.1. Entire Configuration>

FIG. 1 is a diagram illustrating an example of an entire configuration of a system 1 according to the present embodiment. As illustrated in FIG. 1, the system 1 includes a base station 100, a terminal apparatus 200, a core network 20 and a packet data network (PDN) 30.

The base station 100 operates a cell 11 and provides wireless service to one or more terminal apparatuses located within the cell 11. For example, a base station 100A provides wireless service to a terminal apparatus 200A, and a base station 100b provides wireless service to a terminal apparatus 200B. The cell 11 can be operated in accordance with an arbitrary wireless communication scheme such as, for example LTE and new radio (NR). The base station 100 is connected to the core network 20. The core network 20 is connected to the PDN 30.

The core network 20 can include, for example, mobility management entity (MME), a serving gateway (S-GW), a PDN gateway (P-GW), a policy and charging rule function (PCRF) and a home subscriber server (HSS). The MME, which is a control node handling a signal of a control plane, manages a moving state of the terminal apparatus. The S-GW is a control node which handles a signal of a user plane, and is a gateway apparatus which switches a transfer path of user data. The P-GW is a control node which handles a signal of a user plane, and is a gateway apparatus which becomes a connection point between the core network 20 and the PDN 30. The PCRF is a control node which performs control relating to a policy such as quality of service (QoS) with respect to a bearer and charging. The HSS is a control node which handles subscriber data and performs service control.

The terminal apparatus 200 performs wireless communication with the base station 100 on the basis of control by the base station 100. The terminal apparatus 200 may be so-called user equipment (UE). For example, the terminal apparatus 200 transmits an uplink (UL) signal to the base station 100 and receives a downlink (DL) signal from the base station 100.

<1.2. Techniques Relating to Beam Forming>
(1) Codebook Based Beam Forming

The base station 100 can, for example, improve communication quality by performing beam forming to perform communication with the terminal apparatus 200. Methods of beam forming include a method of generating a beam which follows the terminal apparatus 200 and a method of selecting a beam which follows the terminal apparatus 200 among candidates for a beam. It is difficult to employ the former method in a future wireless communication system (for example, 5G) because it involves computational cost every time a beam is generated. Meanwhile, the latter method is employed also in full dimension multiple input multiple output (FD-MIMO) of release 13 of third generation partnership project (3GPP). The latter method is also referred to as a codebook based beam forming.

In the codebook based forming, the base station 100 prepares (that is, generates) beams directed to all directions in advance, selects a beam appropriate for a target terminal apparatus 200 among the beams prepared in advance, and performs communication with the terminal apparatus 200 using the selected beam. For example, in the case where it is possible to perform communication at 360 degrees in a horizontal direction, the base station 100 prepares 360 types of beams, for example, with one-degree increments. In the case where the beams are set such that the beams overlap with each other by half, the base station 100 prepares 720 types of beams. Concerning a vertical direction, the base station 100 prepares beams corresponding to 180 degrees, for example, from −90 degrees to +90 degrees.

(2) Necessity of Beam Association

An extremely large number of antennas (in other words, antenna elements) can be mounted on the base station 100, such that, in the case where a frequency band is 30 GHz, the number of antennas is 256, and in the case where a frequency band is 70 GHz, the number of antennas is 1000. The beam which can be generated becomes extremely sharper as the number of antennas becomes extremely larger. For example, the base station 100 can provide an extremely sharp beam such that a half bandwidth (a value indicating a degree at which a level down by 3 dB starts to occur) is one degree or less.

A beam becoming sharper means that an irradiation range of the beam becomes narrower, and the terminal apparatus 200 is more likely to deviate from the irradiation range of the beam. Therefore, it can be said that it becomes more important to appropriately select a beam which follows the terminal apparatus 200 as the number of antennas becomes larger. Therefore, the base station 100 performs beam association for selecting a beam which is appropriate for communication with the terminal apparatus 200.

The base station 100 selects a beam for transmission (hereinafter, also referred to as a TX beam) for DL communication. Further, the base station 100 selects a beam for reception (hereinafter, also referred to as an RX beam) for UL communication. Note that processing of receiving a UL signal from the terminal apparatus 200 using the RX beam is processing of receiving a UL signal while setting antenna directionality to the beam.

(3) Beam Sweeping

The base station 100 can perform beam sweeping for selecting a beam. Beam sweeping is transmission or reception of a signal while sequentially changing antenna directionality, that is, sequentially changing a beam to be selected. In the following description, a reference signal (RS) of the DL will be also referred to as a downlink reference signal (DL RS). Further, a reference signal of the UL will be also referred to as an uplink reference signal (UL RS).

For example, the base station 100 selects a TX beam appropriate for communication with the terminal apparatus 200 by transmitting the DL RS while performing beam sweeping. For more detail, the base station 100 transmits the DL RS using a plurality of TX beam candidates and selects an appropriate TX beam on the basis of reception results (that is, measurement results) at the terminal apparatus 200. Note that transmission while beam sweeping is performed will be also referred to as TX beam sweeping.

Meanwhile, the base station 100 selects an RX beam which is appropriate for communication with the terminal apparatus 200 by receiving (that is, measuring) the UL RS while performing beam sweeping. For more detail, the base station 100 receives the UL RS transmitted from the terminal apparatus 200 using a plurality of RX beam candidates and selects an appropriate RX beam on the basis of the reception results. Note that reception while beam sweeping is performed will be also referred to as RX beam sweeping.

Note that, in the present embodiment, a signal to be transmitted or received while beam sweeping is performed is a reference signal unless otherwise noted. In the following description, transmission of a reference signal while beam sweeping is performed will be also simply referred to as TX beam sweeping. Further, reception of a reference signal while beam sweeping is performed will be also simply referred to as RX beam sweeping.

(4) Resources for Beam Forming

An example of architecture of a communication device for performing beam forming will be described below with reference to FIG. 2.

Figure 2:
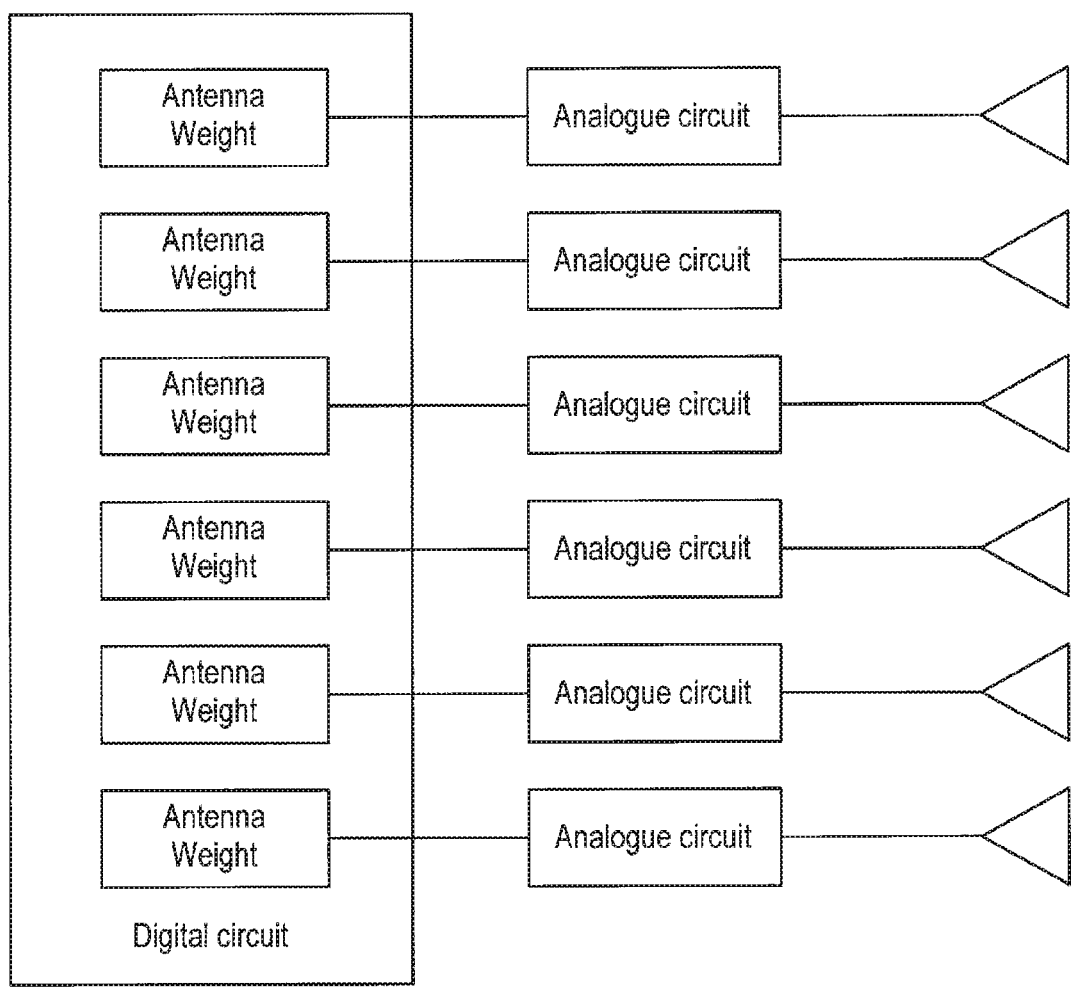
FIG. 2 is a diagram illustrating an example of architecture of a communication device for performing beam forming.

FIG. 2 is a diagram illustrating an example of the architecture of the communication device for performing beam forming. The architecture illustrated in FIG. 2 will be also referred to as full-digital antenna architecture, because all antenna weights are constituted at digital circuits.

In a case of the full-digital antenna architecture, different resources corresponding to the number of beams are used to perform beam sweeping. Meanwhile, in the case where reception is performed while beam sweeping is performed, all beams can be received at the same time in one resource.

Therefore, in the full-digital antenna architecture, it is possible to reduce resources to be used for reception while beam sweeping is performed. That is, in the case where the base station 100 has full-digital antenna architecture, because the terminal apparatus 200 only has to transmit the UL RS corresponding to one resource to select an RX beam, the terminal apparatus 200 consumes low amounts of power.

Note that the resources described here are orthogonal resources using a frequency and/or time. For example, the resources may be a resource block or resource elements of LTE.

Subsequently, another example of the architecture of the communication device for performing beam forming will be described with reference to FIG. 3.

Figure 3:
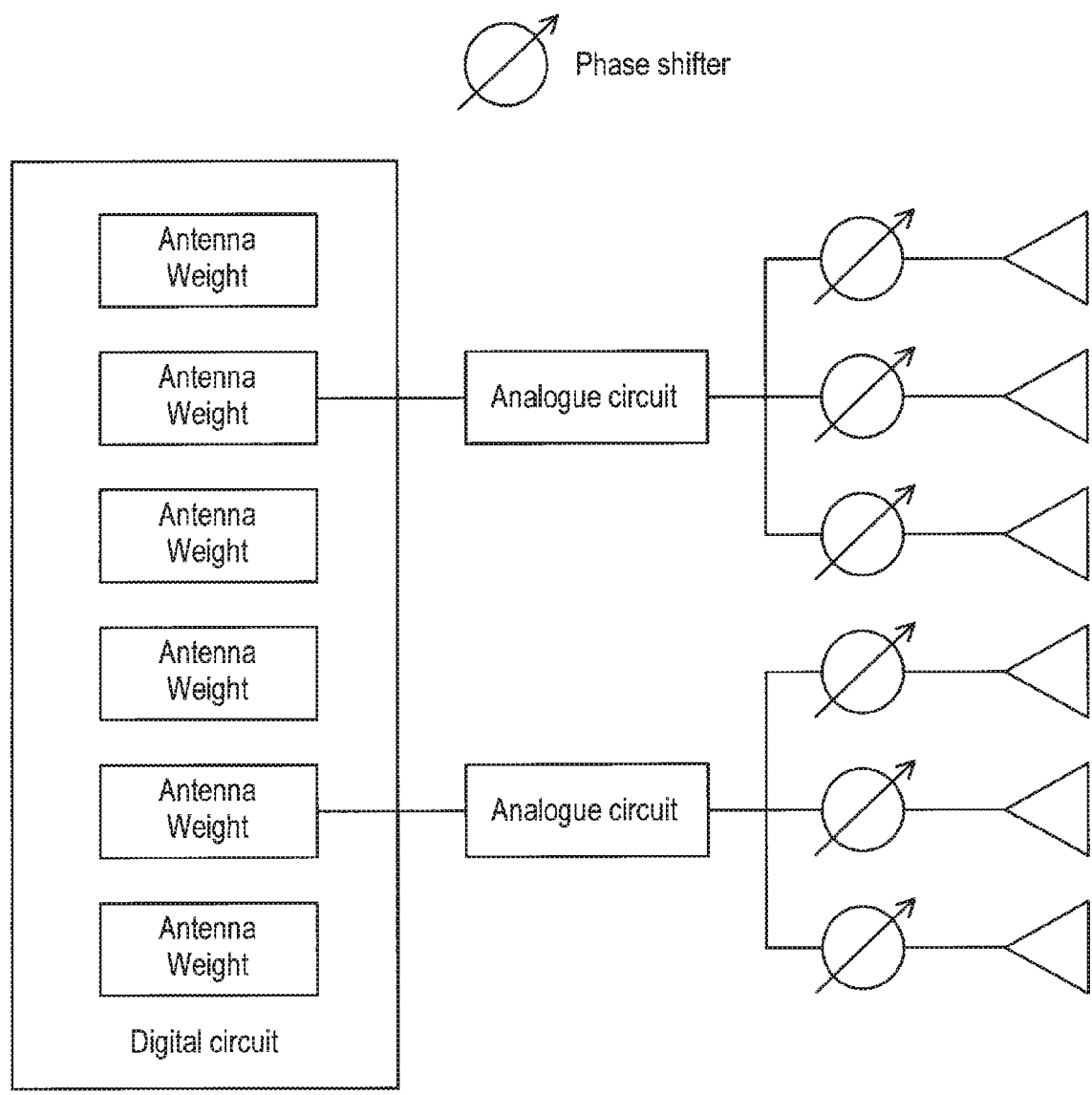
FIG. 3 is a diagram illustrating an example of architecture of a communication device for performing beam forming.

FIG. 3 is a diagram illustrating an example of the architecture of the communication device for performing beam forming. The architecture illustrated in FIG. 3 will be also referred to as an analog/digital hybrid antenna architecture, because the architecture includes a phase shifter of an analog circuit.

It is considered that the hybrid antenna architecture has an advantage in cost compared to the full-digital antenna architecture, because the hybrid antenna architecture has less hardware of a digital circuit. However, with the hybrid antenna architecture, a phase shifter connected to the antenna can only express a beam in one direction. Therefore, different resources corresponding to the number of beams are used also for in TX beam sweeping and in RX beam sweeping. Therefore, the terminal apparatus 200 transmits the UL RS in all the resources corresponding to the number of beams for RX beam sweeping at the base station 100, which significantly increases power consumption of the terminal apparatus 200.

In the case where the hybrid antenna architecture is employed, how to overcome the above-described defect that the number of resources in RX beam sweeping is large is important.

(5) Improve in Efficiency of Beam Sweeping

In the case where beams are prepared with one-degree increments for 360 degrees in a horizontal direction, 360 resources are used in beam sweeping. In contrast, in the case where beams are prepared with 10-degree increments for 360 degrees in the horizontal direction, 36 resources are used in beam sweeping. Therefore, as the beam becomes sharper, an amount of resources to be consumed becomes larger, processing time becomes longer, and power consumption at the terminal apparatus 200 becomes larger.

Figure 4:
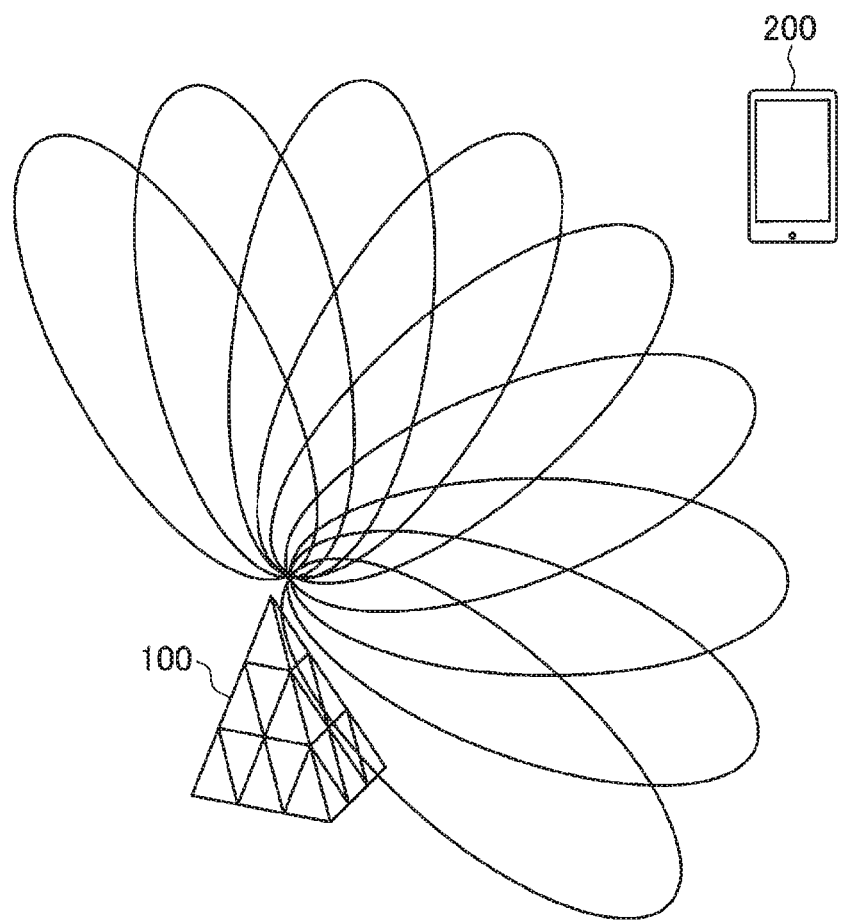
FIG. 4 is a diagram illustrating an example of beam sweeping using a first beam.
Figure 5:
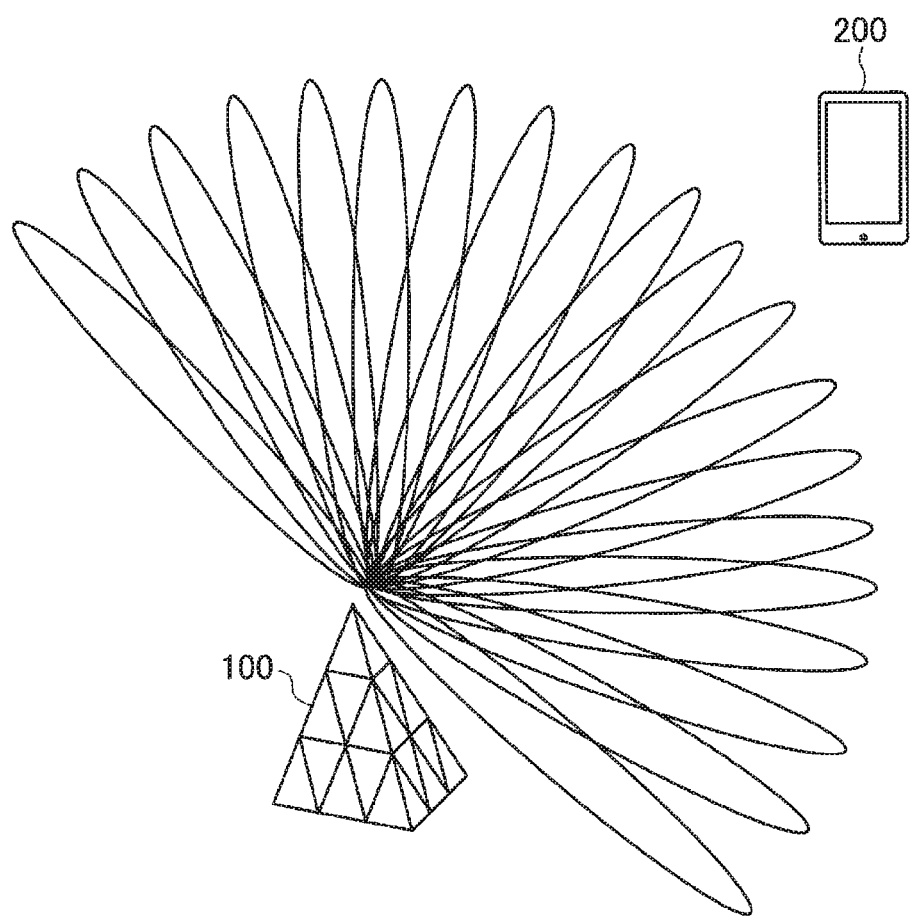
FIG. 5 is a diagram illustrating an example of beam sweeping using a second beam.

Therefore, the base station 100 selects a beam for communication with the terminal apparatus 200 by performing stepwise beam sweeping of beam sweeping using a rough beam illustrated in FIG. 4 and beam sweeping using an accurate beam illustrated in FIG. 5. Here, FIG. 4 is a diagram illustrating an example of beam sweeping using a first beam. FIG. 5 is a diagram illustrating an example of beam sweeping using a second beam. In the following description, the rough beam will be also referred to as the first beam, and the accurate beam will be also referred to as the second beam. An irradiation range of each of the first beam and the second beam will be described below with reference to FIG. 6 and FIG. 7.

Figure 6:
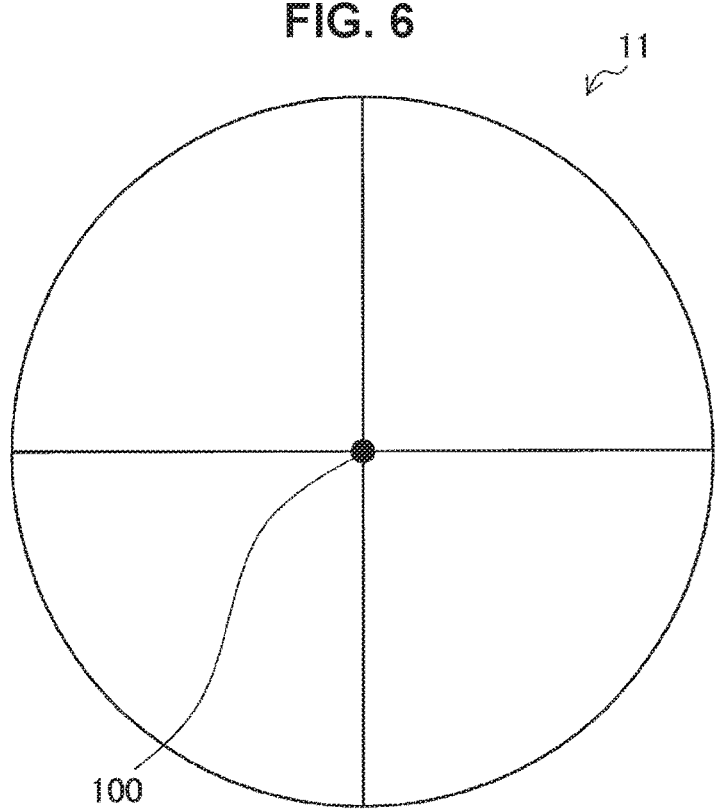
FIG. 6 is a diagram for explaining an example of an irradiation range of the first beam.
Figure 7:
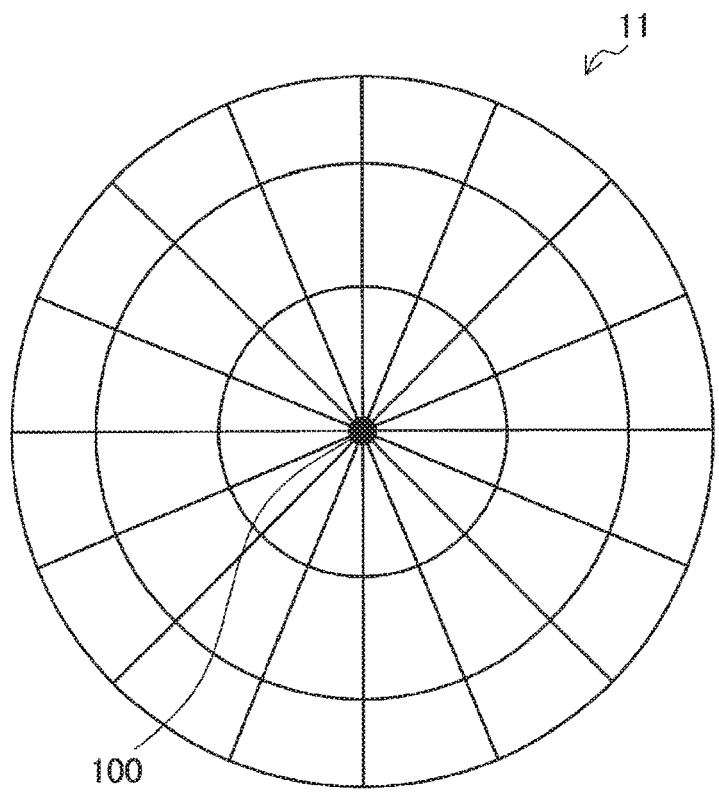
FIG. 7 is a diagram for explaining an example of an irradiation range of the second beam.

FIG. 6 is a diagram for explaining an example of the irradiation range of the first beam. FIG. 7 is a diagram for explaining an example of the irradiation range of the second beam. As illustrated in FIG. 6, one first beam can have an irradiation range which corresponds to one region obtained by dividing the cell 11 into four regions. Then, one second beam has an irradiation range obtained by subdividing the irradiation range of the first beam. In the example illustrated in FIG. 7, the second beam has an irradiation range which corresponds to one region obtained by subdividing one of the four regions which are the irradiation range of the first beam obtained by dividing the cell 11 into four regions, into 12 regions.

The base station 100 selects the second beam by performing beam sweeping using the second beam which has a narrower irradiation range after narrowing down candidates for the second beam by performing beam sweeping using the first beam which has a wider irradiation range.

Specifically, first, the base station 100 selects an optimal first beam by preparing the second beam with 10-degree increments for 360 degrees in the horizontal direction, that is, preparing 36 first beams having resolution of 10 degrees, and performing beam sweeping using 36 resources. Then, the base station 100 selects an optimal second beam by performing beam sweeping using 10 second beams with one-degree increments corresponding to 10 degrees of the optimal first beam, and 10 resources. In this case, total 46 resources of 36+10 are used, so that it is possible to significantly reduce an amount of resources to be consumed, processing time and power consumption at the terminal apparatus 200 compared to the above-described case where 360 resources are used.

Note that the first beam may be a beam having a half bandwidth larger than that of the second beam or may include a plurality of second beams. In the former case, processing of transmitting the DL RS using one first beam is processing of transmitting the DL RS using one first beam in one resource. In the latter case, processing of transmitting the DL RS using one first beam is processing of transmitting the DL RS using the plurality of second beams included in the first beam at the same time in one resource.

(6) Beam Association by a Plurality of Base Stations

Figure 8:
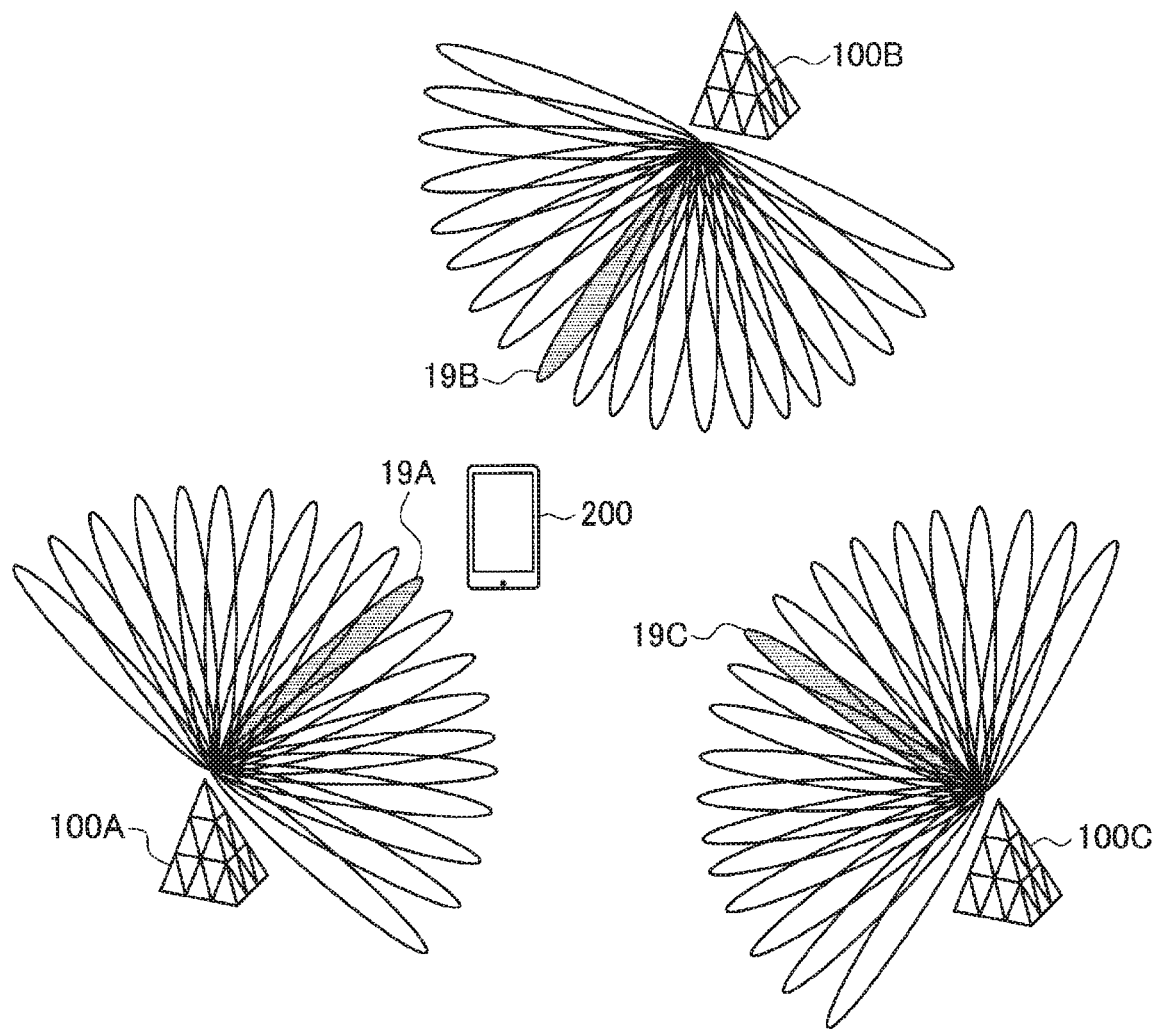
FIG. 8 is a diagram for explaining an example of beam association by a plurality of base stations.

FIG. 8 is a diagram for explaining an example of beam association by a plurality of base stations 100. In the case where a plurality of base stations 100 exists around the terminal apparatus 200, there is a case where the plurality of base stations 100 select a TX beam and an RX beam for the terminal apparatus 200 to perform, for example, coordinated multiple point transmission/reception (CoMP). In the example illustrated in FIG. 8, the base station 100A selects a beam 19A, the base station 100B selects a beam 19B, and the base station 100C selects a beam 19C. To enable beam selection at the plurality of base stations 100, reception load or transmission load of the RS at the terminal apparatus 200 can increase. Note that, for example, a base station closest to the terminal apparatus 200, a serving base station or a main base station among the plurality of base stations 100A to 100C may select a beam of each of the base stations 100A to 100C and may notify other base stations of selection results.

(7) Channel Reciprocity

Channel reciprocity means that channel information of the UL is the same as channel information of the DL. In a time division duplex (TDD) system, because frequency bands to be used in the UL and in the DL are the same, typically, the UL and the DL have channel reciprocity. However, it is assumed that calibration is performed so that a transmission function and a reception function of analog circuits at the base station 100 and the terminal apparatus 200 have the same characteristics.

In the case where the UL and the DL have channel reciprocity, the TX beam is the same as the RX beam. That is, in the case where the base station 100 selects a TX beam by performing TX beam sweeping, the base station 100 can select an RX beam without performing RX beam sweeping.

An example of flow of typical beam association processing of performing stepwise beam sweeping in the case where the UL and the DL have channel reciprocity, will be described with reference to FIG. 9.

Figure 9:
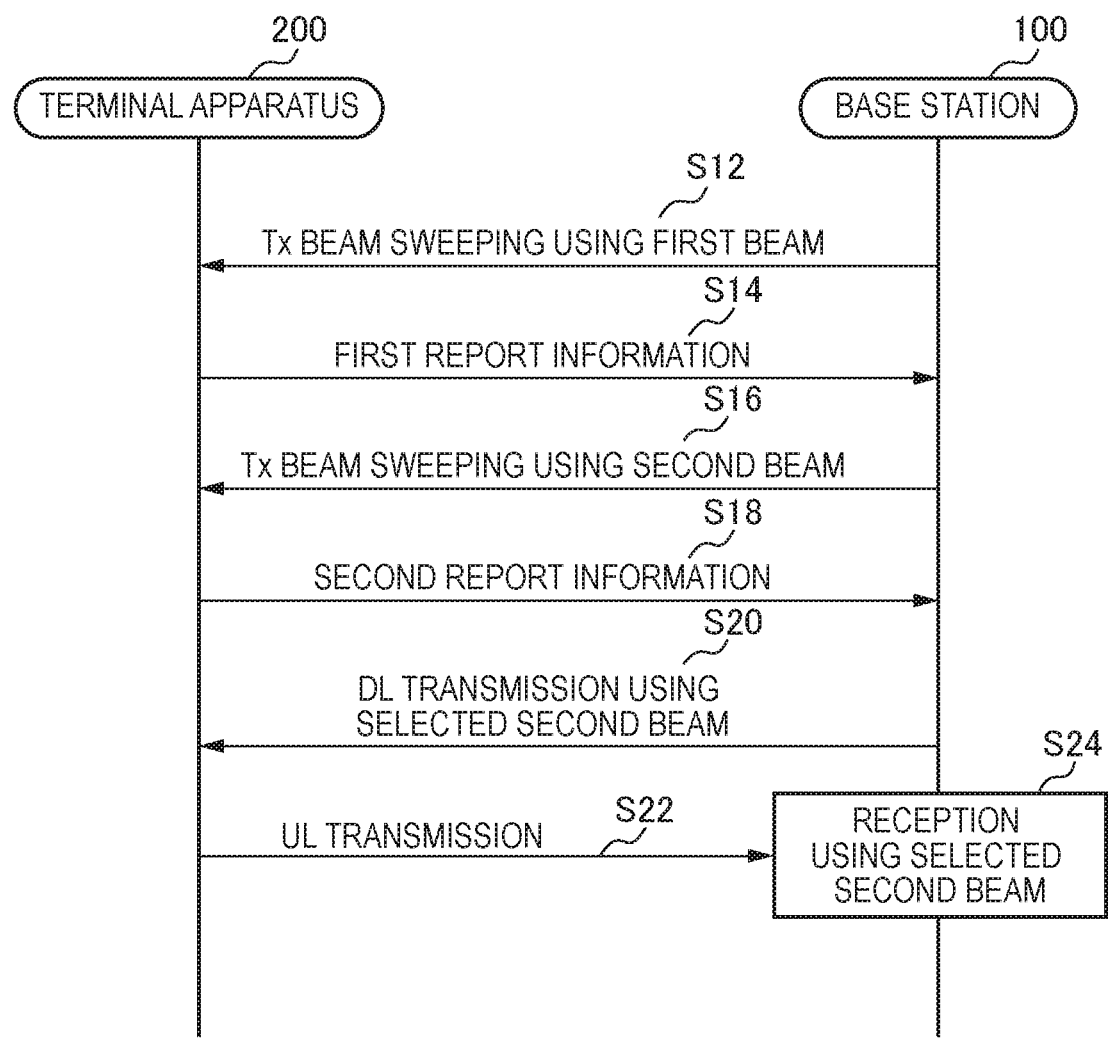
FIG. 9 is a sequence diagram illustrating an example of flow of typical beam association processing.

FIG. 9 is a sequence diagram illustrating an example of the flow of the typical beam association processing. As illustrated in FIG. 9, the base station 100 and the terminal apparatus 200 are involved in the present sequence.

First, the base station 100 performs TX beam sweeping using the first beam (step S12). This TX beam sweeping may be performed using a base station-specific TX beam sweeping pattern. The beam sweeping pattern described here indicates correspondence relationship as to which resource corresponds to which beam.

The terminal apparatus 200 then reports first report information including a reception result of the DL RS transmitted using the first beam to the base station 100 (step S14). The first report information can include identification information of the first beam which is the most desirable for the terminal apparatus 200.

Then, the base station 100 performs TX beam sweeping using the second beam (step S16). Particularly, the base station 100 performs TX beam sweeping using a plurality of second beams having irradiation ranges obtained by subdividing the irradiation range of the first beam indicated in the first report information.

Note that this TX beam sweeping may be performed using a UE-specific. TX beam sweeping pattern which is prepared for a target terminal apparatus 200. Alternatively, a common TX beam sweeping pattern may be prepared for all the terminal apparatuses 200, and a notification may be made for each terminal apparatus 200 as to which part should be monitored. In the former case, the TX beam sweeping pattern itself is specific to the UE. In the latter case, setting as to which part should be monitored is specific to the UE.

The terminal apparatus 200 then reports second report information including reception results of the DL RS transmitted using the second beams to the base station 100 (step S18). The second report information can include identification information of the second beam which is the most desirable for the terminal apparatus 200.

The base station 100 then selects a second beam on the basis of the second report information and transmits DL user data using the selected second beam (step S20). For example, the base station 100 transmits the DL user data using the second beam indicated in the second report information.

Then, the terminal apparatus 200 transmits UL user data (step S22). In the case where channel reciprocity is secured, the base station 100 receives the UL user data using the selected second beam (that is, using the second beam which is optimal as the TX beam as the RX beam) (step S24).

Figure 10:
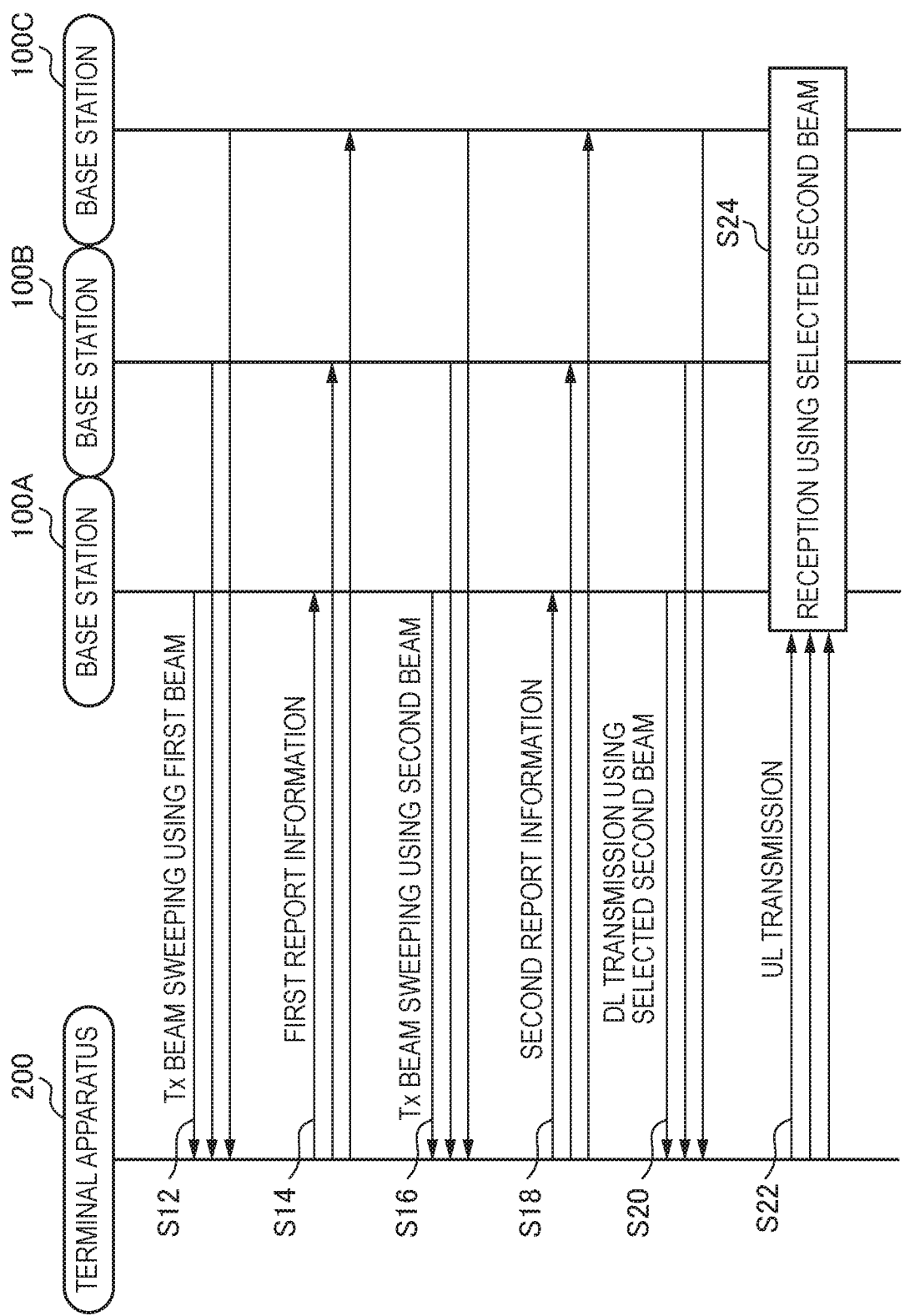
FIG. 10 is a sequence diagram illustrating an example of flow of typical beam association processing.

Subsequently, an example of flow of typical beam association processing in the case where there is a plurality of base stations 100 will be illustrated in FIG. 10. FIG. 10 is a sequence diagram illustrating an example of the flow of the typical beam association processing. As illustrated in FIG. 10, in the case where there is a plurality of base stations 100, the sequence illustrated in FIG. 9 is repeated the number of times corresponding to the number of the base stations 100. Because each processing included in the present sequence is as described above with reference to FIG. 9, description will be omitted here.

2. Configuration Example of Each Apparatus

An example of a configuration of the base station 100 and the terminal device 200 will be described below with reference to FIGS. 11 and 12.

<2.1. Configuration Example of Base Station>

Figure 11:
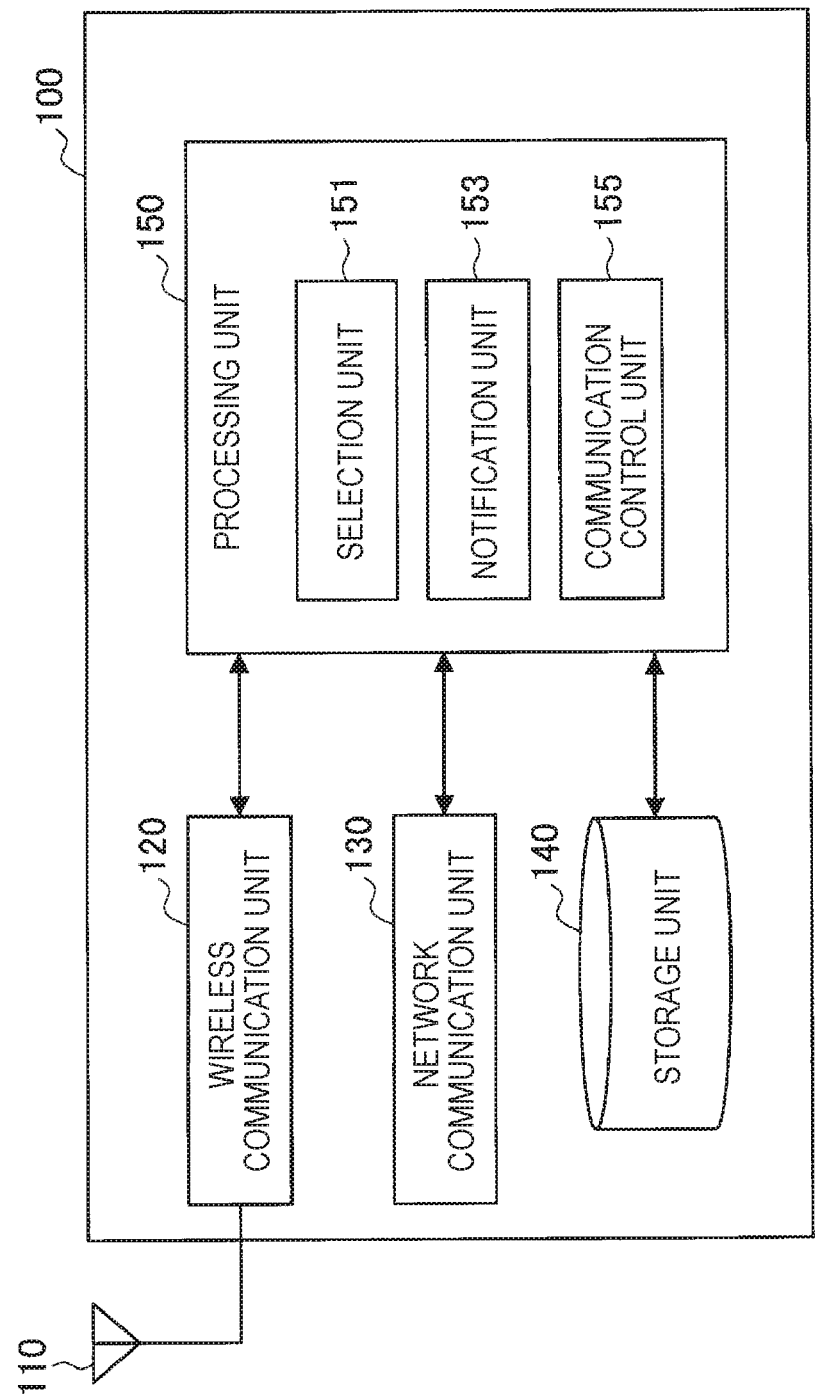
FIG. 11 is a block diagram illustrating an example of a configuration of a base station according to the present embodiment.

FIG. 11 is a block diagram illustrating an example of a configuration of the macro cell base station 100 according to the present embodiment. As illustrated in FIG. 11, the macro cell base station 100 includes an antenna unit 110, the wireless communication unit 120, a network communication unit 130, a storage unit 140 and a processing unit 150.

(1) Antenna Unit 110

The antenna unit 110 emits a signal to be output by the wireless communication unit 120 into space as radio waves. In addition, the antenna unit 110 converts spatial radio waves into a signal and outputs the signal to the wireless communication unit 120.

In the present embodiment, the antenna unit 110 has a plurality of antennas (that is, antenna elements), and performs transmission or reception by forming beams using the plurality of antennas.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to another node and receives information from the other node. For example, the other node includes another base station and a core network node.

(4) Storage Unit 140

The storage unit 140 temporarily or permanently stores a program and various data for an operation of the base station 100.

(5) Processing Unit 150

The processing unit 150 provides various functions of the base station 100. The processing unit 150 includes a selection unit 151, a notification unit 153 and a communication control unit 155. The selection unit 151 performs processing of selecting a beam appropriate for communication with the terminal apparatus 200. The notification unit 153 performs processing of notifying the terminal apparatus 200 of resource setting information which will be described later. The communication control unit 155 performs processing of performing communication with the terminal apparatus 200 using the beam selected by the selection unit 151.

Further, the processing unit 150 may further include other components than these components. In other words, the processing unit 150 may also perform operations other than those of these components.

<2.2. Configuration Example of Terminal Apparatus>

Figure 12:
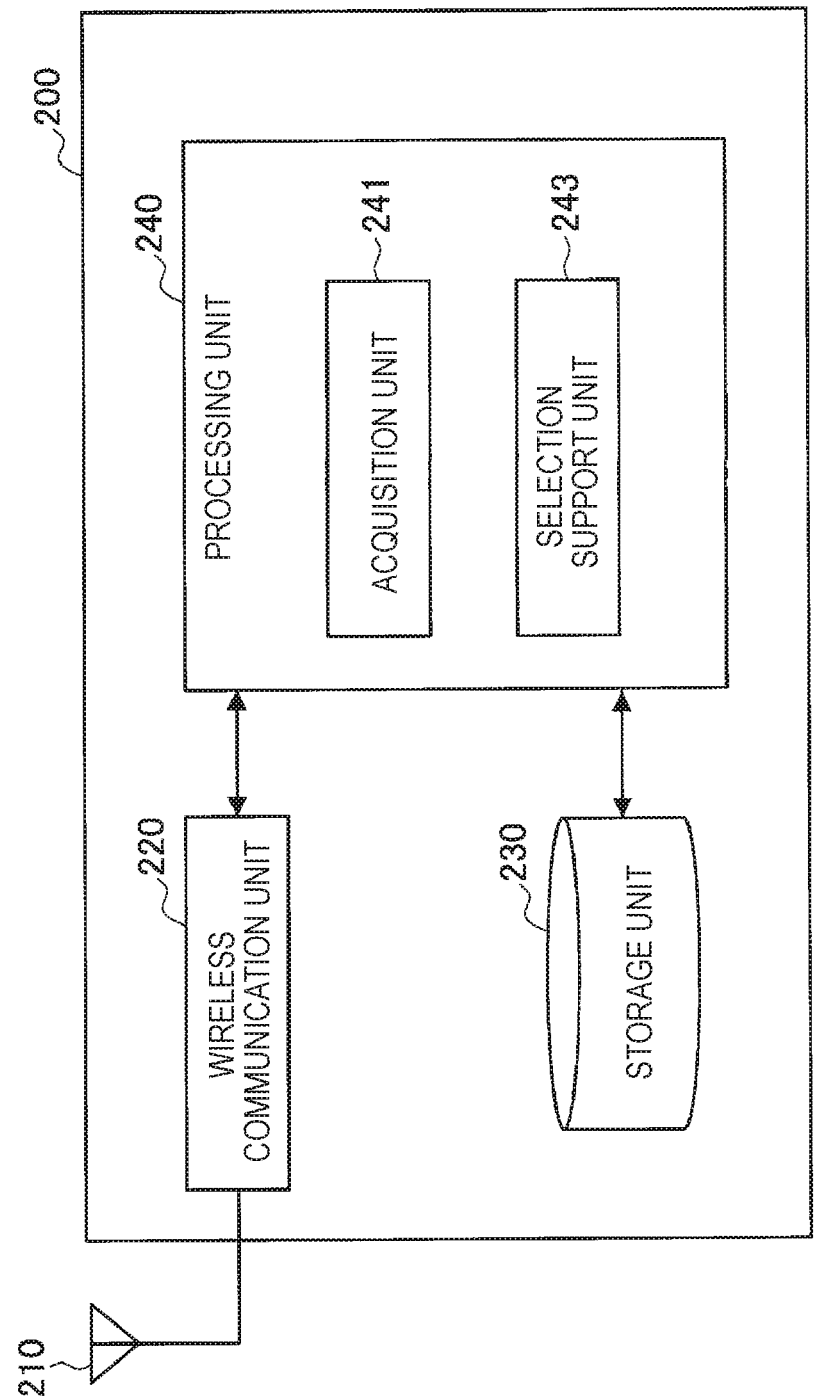
FIG. 12 is a block diagram illustrating an example of a configuration of a terminal apparatus according to the present embodiment.

FIG. 12 is a block diagram illustrating an example of a configuration of the terminal apparatus 200 according to the present embodiment. As illustrated in FIG. 12, the terminal apparatus 200 includes an antenna unit 210, a wireless communication unit 220, a storage unit 230 and a processing unit 240.

(1) Antenna Unit 210

The antenna unit 210 emits a signal to be output by the wireless communication unit 220 into space as radio waves. In addition, the antenna unit 210 converts spatial radio waves into a signal and outputs the signal to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores a program and various data for an operation of the terminal apparatus 200.

(4) Processing Unit 240

The processing unit 240 provides various functions of the terminal apparatus 200. The processing unit 240 includes an acquisition unit 241 and a selection support unit 243. The acquisition unit 241 performs processing of acquiring resource setting information notified from the base station 100. The selection support unit 243 performs processing for supporting beam selection at the base station 100.

Further, the processing unit 240 may further include other components than these components. In other words, the processing unit 240 may also perform operations other than the operations of these components. The operations of the setting unit 241 and the communication control unit 243 will be described later in detail.

3. First Embodiment

The present embodiment is an embodiment in which the base station 100 selects the first beam through TX beam sweeping, and selects the second beam through TX beam sweeping.

<3.1. Technical Problems>

In the case where the base station 100 transmits a reference signal while performing beam sweeping, the terminal apparatus 200 receives the reference signal in resources of the number corresponding to the number of beams, which leads to a great amount of power consumption for reception. This problem becomes more serious in the case where the number of beams becomes larger as in MIMO. Therefore, it is desirable to minimize the number of resources to be used for transmitting and receiving the reference signal.

<3.2. Technical Features>

(1) Stepwise Beam Association

The base station 100 (for example, the selection unit 151) performs beam sweeping using the first beam, and then, performs beam sweeping using the second beam. For more detail, the base station 100 selects a second beam appropriate for communication with the terminal apparatus 200 on the basis of reception results of a plurality of second reference signals transmitted or received using a plurality of second beams having irradiation ranges obtained by subdividing an irradiation range of a first beam appropriate for communication with the terminal apparatus 200 which is selected on the basis of reception results of a plurality of first reference signals transmitted using a plurality of first beams which are formed by a plurality of antennas and which are set in advance. The base station 100 selects at least the second beam, and, typically, also selects the first beam. As will be described later, there is a case where the first report information is not reported from the terminal apparatus 200, and the first beam is selected by the terminal apparatus 200. Here, the first beam is a TX beam. Meanwhile, the second beam may be a TX beam or an RX beam. In the present embodiment, an example will be described where the second beam is a TX beam, and in a second embodiment, an example will be described where the second beam is an RX beam. In the present embodiment, a first reference signal and a second reference signal are downlink reference signals transmitted from the base station 100. The first reference signal and the second reference signal may be, for example, a channel state information reference signal (CSI-RS), a cell-specific reference signal (CRS), or the like.

Typically, first, the base station 100 transmits the first reference signals respectively using the plurality of first beams, and selects a first beam on the basis of first report information indicating reception results of the first reference signals reported from the terminal apparatus 200. The first report information can include identification information of the first beam which is the most desirable for the terminal apparatus 200. In this case, processing of selecting the first beam performed by the base station 100 is processing of employing selection by the terminal apparatus 200 as is. In addition, the first report information can include received power (for example, reference signal received power (RSRP)) or received quality (reference signal received quality (RSRQ)) of each of the first reference signals transmitted respectively using the plurality of first beams. In this case, processing of selecting the first beam performed by the base station 100 is processing of selecting the first beam used for transmission of the reference signal having the highest received power or the highest received quality. In the following description, description will be provided assuming that the terminal apparatus 200 selects the first beam, and the base station 100 employs the selection result by the terminal apparatus 200 as is. Note that the terminal apparatus 200 can know the selection result of the first beam by being notified of the selection result from the base station 100 or by selecting the first beam in accordance with criteria similar to those at the base station 100.

Next, the base station 100 transmits the second reference signals respectively using the plurality of second beams having irradiation ranges obtained by subdividing the irradiation range of the selected first beam, and selects a second beam on the basis of second report information indicating reception results of the second reference signals reported from the terminal apparatus 200. The second report information can include identification information of the second beam which is the most desirable for the terminal apparatus 200. In this case, processing of selecting the second beam performed by the base station 100 is processing of employing selection by the terminal apparatus 200 as is. In addition, the second report information can include received power or received quality of each of the second reference signals transmitted respectively using the plurality of second beams. In this case, processing of selecting the second beam performed by the base station 100 is processing of selecting the second beam used for transmission of the reference signal having the highest received power or the highest received quality. In the following description, description will be provided assuming that the terminal apparatus 200 selects the second beam, and the base station 100 employs the selection result by the terminal apparatus 200 as is. Note that the terminal apparatus 200 can know the selection result of the second beam by being notified of the selection result from the base station 100 or by selecting the second beam in accordance with criteria similar to those at the base station 100.

(2) Resource Setting Information

The base station 100 (for example, the notification unit 153) notifies terminal apparatus 200 of information indicating arrangement relationship between a plurality of first resources corresponding to the plurality of first beams for the first reference signals and a plurality of second resources corresponding to the plurality of second beams for the second reference signals. For more detail, the base station 100 notifies the terminal apparatus 200 of information indicating arrangement relationship between the corresponding first resource and the plurality of second resources corresponding to the plurality of second beams having irradiation ranges obtained by subdividing the irradiation range of the first beam, for each first beam. This information indicating the arrangement relationship will be also referred to as resource setting information below.

An example of the resource setting information will be indicated in the following Table 1.

TABLE 1

An example of resource setting information

| Identification information of first beam | Arrangement of first resource | Identification information of second beam | Arrangement of second resource |
|---|---|---|---|
| $X_1$ | $(F_1, T_1)$ | $X_{11}$ | $(F_{11}, T_{11})$ |
|  |  | $X_{12}$ | $(F_{12}, T_{12})$ |
|  |  | $X_{13}$ | $(F_{13}, T_{13})$ |
|  |  | $X_{14}$ | $(F_{14}, T_{14})$ |
| $X_2$ | $(F_2, T_2)$ | $X_{21}$ | $(F_{21}, T_{21})$ |
|  |  | $X_{22}$ | $(F_{22}, T_{22})$ |
|  |  | $X_{23}$ | $(F_{23}, T_{23})$ |
|  |  | $X_{24}$ | $(F_{24}, T_{24})$ |
| ... | ... | ... | ... |

"F" in the above-described Table 1 indicates a frequency resource, "T" indicates a time resource, and, for example, a resource $(F_1, T_1)$ is an orthogonal resource of a frequency $F_1$ and time $T_1$. Further, for example, identification information of the second beams having irradiation ranges obtained by subdividing the irradiation range of the first beam having the identification information $X_1$ is $X_{11}$ to $X_{14}$. As indicated in the above-described Table 1, the resource setting information includes information in which identification information of the first beams, arrangement of the first resources corresponding to the first beams, identification information of the second beams having irradiation ranges obtained by subdividing the irradiation ranges of the first beams, and arrangement of the second resources corresponding to the second beams are associated. Note that, while, in the above-described table, arrangement of the second resources is expressed as absolute resource locations, the arrangement of the second resources may be expressed as relative resource locations. For example, the arrangement of the second resources may be expressed as differences from arrangement of the first resources.

A notification of the resource setting information may be made such that a notification of first resource setting information which is resource setting information regarding the first resources and a notification of second resource setting information which is resource setting information regarding the second resources are separately made. In this case, the first resource setting information includes, for example, information in which identification information of the first beams, identification information of the second beams having irradiation ranges obtained by subdividing irradiation ranges of the first beams, and arrangement of the first resources corresponding to the first beams are associated. Further, the second resource setting information includes, for example, information in which identification information of the second beams, identification information of the first beams having irradiation ranges including irradiation ranges of the second beams, and arrangement of the second resources corresponding to the second beams are associated.

There can be a variety of resource setting. An example of the resource setting will be described below with reference to FIG. 13 to FIG. 15.

Figure 13:
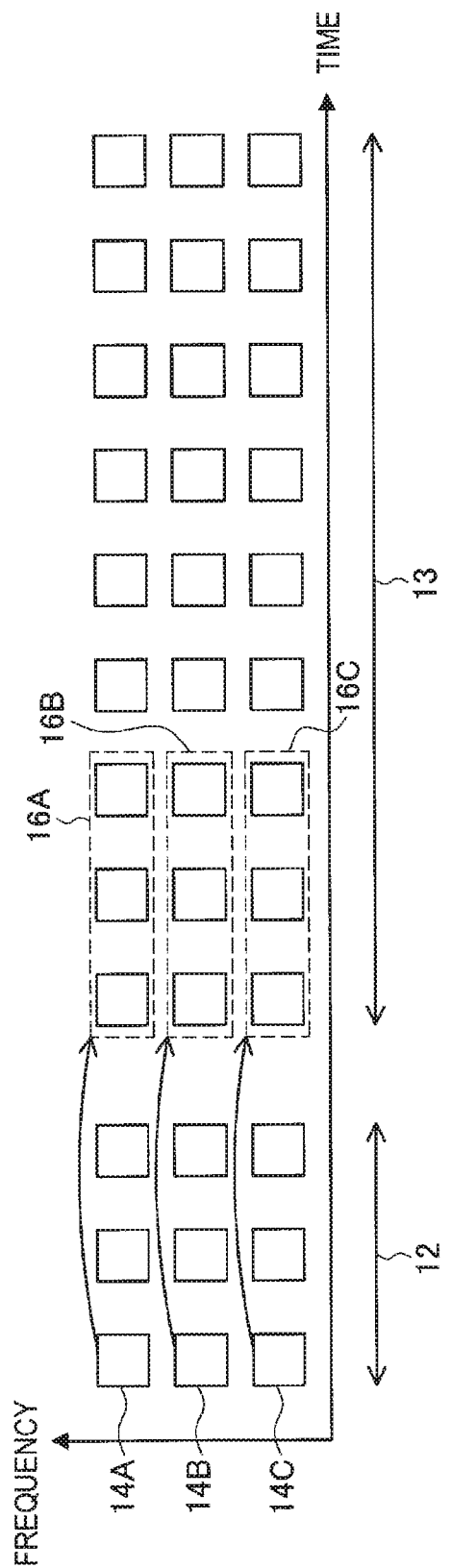
FIG. 13 is a diagram for explaining an example of resource setting according to a first embodiment.

FIG. 13 is a diagram for explaining an example of the resource setting according to the present embodiment. FIG. 13 indicates time on a horizontal axis, and a frequency on a vertical axis, and one rectangle indicates a resource for a reference signal to be transmitted using one beam. Resources included in a segment 12 are first resources, and resources included in a segment 13 are second resources. Then, a first resource 14A is associated with second resources included in a group 16A. For more details, second resources corresponding to second beams having irradiation ranges obtained by subdividing an irradiation range of a first beam corresponding to the first resource 14A are included in the group 16A. In a similar manner, a first resource 14B is associated with second resources included in a group 16B, and a first resource 14C is associated with second resources included in a group 16C.

Figure 14:
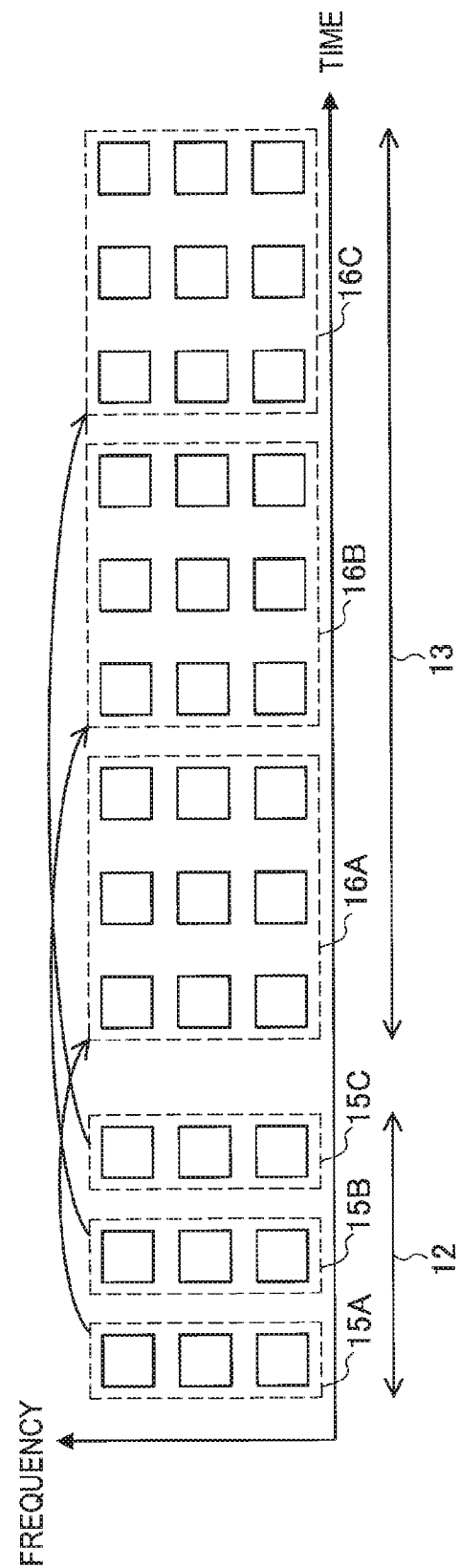
FIG. 14 is a diagram for explaining an example of resource setting according to the first embodiment.

FIG. 14 is a diagram for explaining an example of the resource setting according to the present embodiment. FIG. 14 indicates time on a horizontal axis, and a frequency on a vertical axis, and one rectangle indicates a resource for a reference signal to be transmitted using one beam. Resources included in a segment 12 are first resources, and resources included in a segment 13 are second resources. Then, a first resource included in a group 15A is associated with second resources included in a group 16A. For more details, second resources corresponding to second beams having irradiation ranges obtained by subdividing an irradiation range of a first beam corresponding to the first resource included in a group 15A are included in the group 16A. In a similar manner, a first resource included in a group 15B is associated with second resources included in a group 16B, and a first resource included in a group 15C is associated with second resources included in a group 16C.

As illustrated in FIG. 13 and FIG. 14, all the second resources may be arranged in time resources after all the first resources. More simply, the first resources and the second resources may be arranged away from each other in a time direction.

Figure 15:
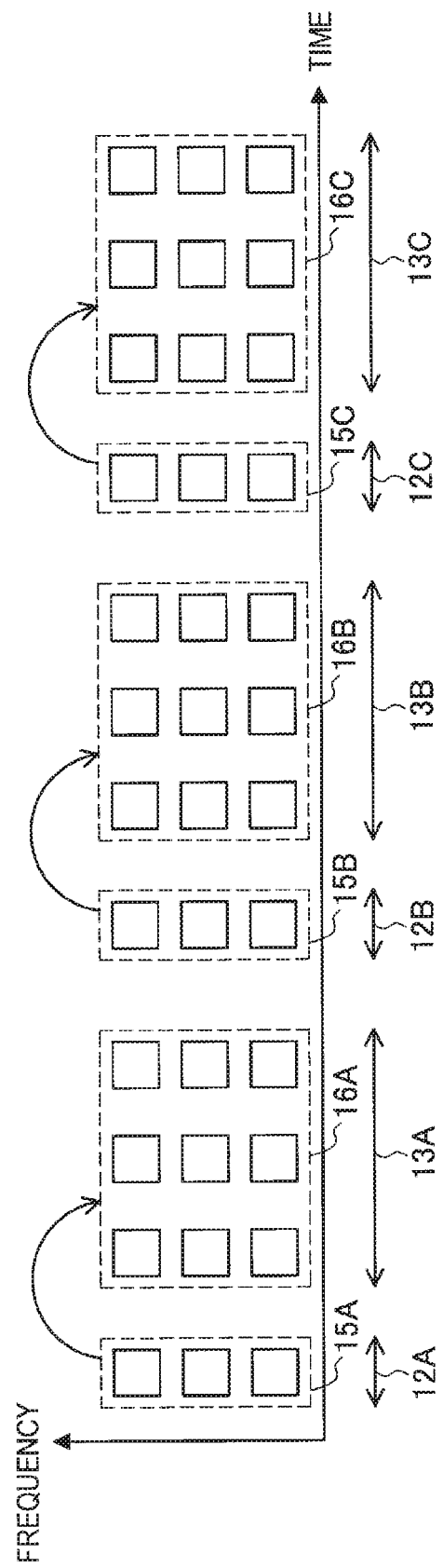
FIG. 15 is a diagram for explaining an example of resource setting according to the first embodiment.

FIG. 15 is a diagram for explaining an example of the resource setting according to the present embodiment. FIG. 15 indicates time on a horizontal axis, and a frequency on a vertical axis, and one rectangle indicates a resource for a reference signal to be transmitted using one beam. Resources included in segments 12A to 12C are first resources, and resources included in segments 13A to 13C are second resources. Then, a first resource included in a group 15A is associated with second resources included in a group 16A. For more details, second resources corresponding to second beams having irradiation ranges obtained by subdividing an irradiation range of a first beam corresponding to the first resource included in a group 15A are included in the group 16A. In a similar manner, a first resource included in a group 15B is associated with second resources included in a group 16B, and a first resource included in a group 15C is associated with second resources included in a group 16C.

As illustrated in FIG. 15, the first resources and the second resources may be arranged in an overlapped manner. However, a plurality of second resources corresponding to a plurality of second beams having irradiation ranges obtained by subdividing irradiation ranges of the first beams corresponding to the first resources is arranged at least in time resources after the first resources. By this means, the second reference signals are transmitted using the second beams at time after the first reference signals are transmitted using the first beams. Therefore, it is possible to select a first beam on the basis of reception results of the first reference signals from when the first reference signals are received until the second reference signals are received. However, the terminal apparatus 200 requires to select a first beam which can be optimal to narrow down second beams to be received before evaluating all the first beams. Therefore, the terminal apparatus 200 evaluates the first beams using absolute evaluation instead of relative evaluation. For example, the terminal apparatus 200 sets the second reference signals transmitted using the second beams having irradiation ranges obtained by subdividing irradiation ranges of the first beams used for the first reference signals having received power higher than a predetermined threshold, as reception targets.

From the circumstances described above, because the second beams obtained by subdividing irradiation ranges of a plurality of first beams can become reception targets in the resource setting illustrated in FIG. 15, the resource setting illustrated in FIG. 13 or FIG. 14 is preferable in terms of power consumption of the terminal apparatus 200. Meanwhile, it can be said that the resource setting illustrated in FIG. 15 excels compared to the resource setting illustrated in FIG. 13 or FIG. 14 in that it is possible to find appropriate second beams before all the first beams are evaluated. For example, in the case where TX beam sweeping using the first beams is performed only on part of the first beams, the resource setting illustrated in FIG. 15 has an advantage.

Note that association between the first beams and the second beams is easier in the overlapped arrangement as illustrated in FIG. 15 than in the arrangement illustrated in FIG. 13 or FIG. 14. Therefore, concerning the overlapped arrangement, the resource setting information may be defined as standards as well as the terminal apparatus 200 being notified of the resource setting information from the base station 100. In this case, a notification of the resource setting information from the base station 100 to the terminal apparatus 200 is omitted, so that power consumption at the terminal apparatus 200 is reduced.

Further, the resource setting may be specific to the base station 100. That is, common resource setting may be set for all the terminal apparatuses 200 connected to the base station 100.

(3) Beam Association Based on Resource Setting Information

The terminal apparatus 200 (for example, the acquisition unit 241) acquires the resource setting information. The terminal apparatus 200 (for example, the selection support unit 243) then performs processing for supporting beam selection by the base station 100 on the basis of the resource setting information. The beam selection here includes at least selection of a second beam, and may further include selection of a first beam. Further, supporting includes, for example, processing of reporting report information or processing of transmitting reference signals.

For example, the terminal apparatus 200 receives the first reference signals and reports first report information indicating reception results of the first reference signals to the base station 100. The first report information can include identification information of a first beam which is the most desirable for the terminal apparatus 200, or received power, received quality, or the like, of each of the first reference signals transmitted respectively using a plurality of first beams. As will be described later, report of the first report information may be omitted. Further, the terminal apparatus 200 receives second reference signals and reports second report information indicating reception results of the second reference signals to the terminal apparatus 200. The second report information can include identification information of a second beam which is the most desirable for the terminal apparatus 200 or received power, received quality, or the like, of each of the second reference signals transmitted respectively using a plurality of second beams.

Here, the terminal apparatus 200 can select one appropriate first beam or narrow down the first beams to less first beams on the basis of the reception results of the first reference signals. By this means, the terminal apparatus 200 can specify a plurality of second resources corresponding to the plurality of second beams having irradiation ranges obtained by subdividing an irradiation range of the selected first beam with reference to the resource setting information. That is, the terminal apparatus 200 can specify the second resources to be received without being notified of the second resources to be received from the base station 100 by referring to the resource setting information. In this case, the terminal apparatus 200 receives the second reference signals in the specified second resources and reports second report information indicating reception results of the second reference signals to the base station. Therefore, it is possible to eliminate power consumption for receiving information for specifying the second resources from the base station 100 at the terminal apparatus 200.

The terminal apparatus 200 may omit report of the first report information. In this case, it is possible to further reduce power consumption. A case where the first report information is reported, and a case where report of the first report information is omitted will be sequentially described below.

In the case where the first report information is reported, the base station 100 transmits the second reference signals in limited second beams having irradiation ranges obtained by subdividing the irradiation range of the selected first beam. The terminal apparatus 200 can reduce power consumption by limiting resources in which the second reference signals are to be received to the second resources corresponding to the second beams having the irradiation ranges obtained by subdividing the irradiation range of the selected first beam, by referring to the resource setting information.

In the case where the first report information is not reported, the base station 100 transmits the second reference signals respectively using a plurality of second beams having irradiation ranges obtained by subdividing the respective irradiation ranges of a plurality of first beams, and selects the second beam on the basis of the second report information. More simply, the base station 100 transmits the second reference signals using all the second beams. Also in this case, the terminal apparatus 200 can reduce power consumption by limiting resources in which the second reference signals are to be received to the second resources corresponding to the second beams having the irradiation ranges obtained by subdividing the irradiation range of the selected first beam, by referring to the resource setting information.

An example of flow of the above-described beam association processing will be described below with reference to FIG. 16.

Figure 16:
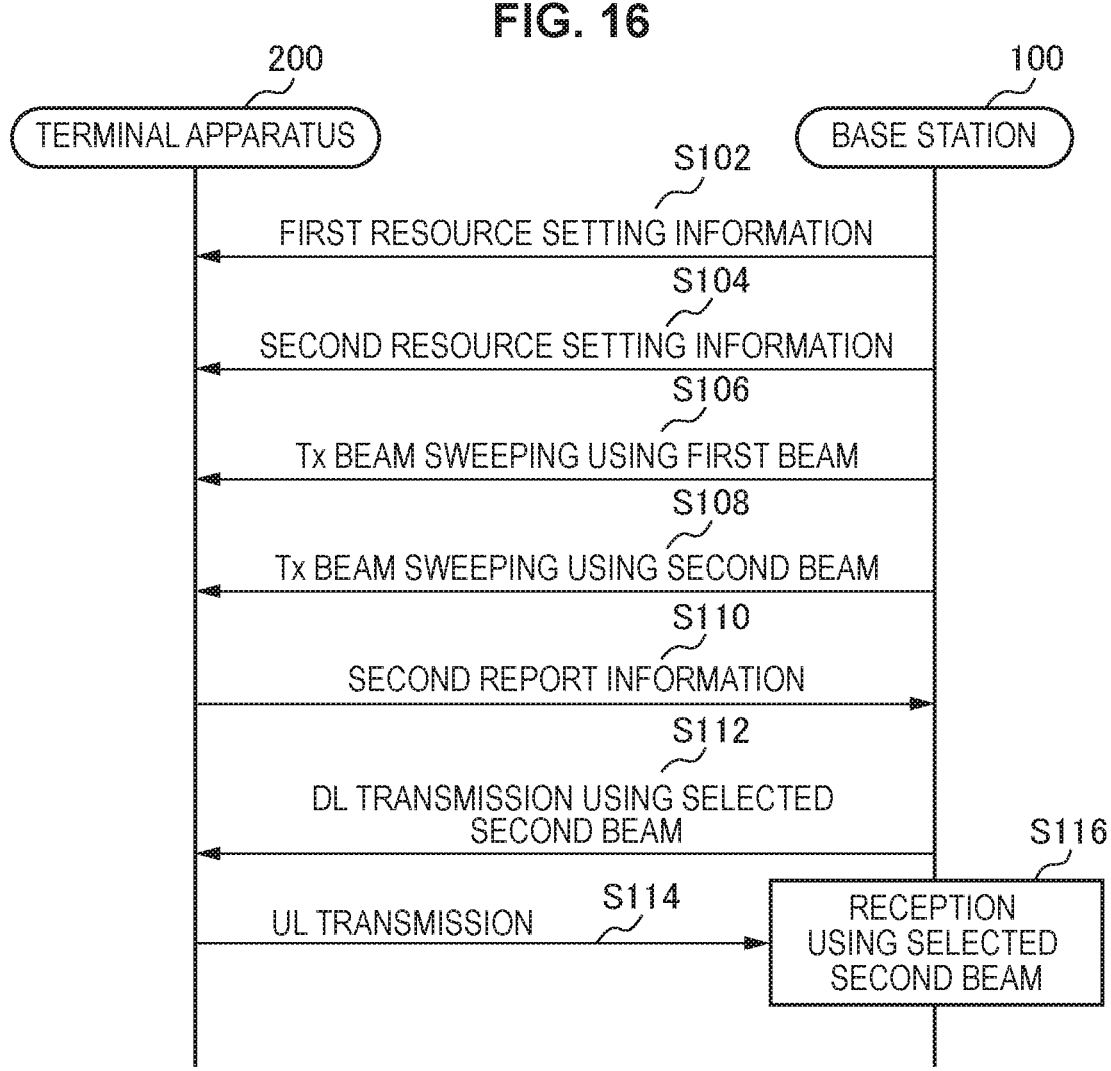
FIG. 16 is a sequence diagram illustrating an example of flow of beam association processing to be executed in a system according to the first embodiment.

FIG. 16 is a sequence diagram illustrating an example of the flow of the beam association processing to be executed in the system 1 according to the present embodiment. As illustrated in FIG. 16, the base station 100 and the terminal apparatus 200 are involved in the present sequence.

First, the base station 100 transmits the first resource setting information to the terminal apparatus 200 (step S102). Further, the base station 100 transmits the second resource setting information to the terminal apparatus 200 (S104). In this manner, a notification of the resource setting information may be made such that a notification of the first resource setting information and a notification of the second resource setting information are separately made.

The base station 100 then transmits the first reference signals in the respective first resources indicated in the first resource setting information while performing TX beam sweeping using the first beams (step S106).

Meanwhile, the terminal apparatus 200 selects the most desirable first beam on the basis of reception results of the first reference signals. The terminal apparatus 200 then sets the second resources corresponding to the second beams having irradiation ranges obtained by subdividing the irradiation range of the selected first beam, as reception targets.

The base station 100 then transmits the second reference signals in the respective second resources indicated in the second resource setting information while performing TX beam sweeping using the second beams (step S108). Particularly, because a selection result at the terminal apparatus 200 is not known, the base station 100 transmits the second reference signals in all the second resources while performing TX beam sweeping using all the second beams.

The terminal apparatus 200 then reports second report information including reception results of the second reference signals transmitted using the second beams to the base station 100 (step S110). The second report information can include identification information of the second TX beam which is the most desirable for the terminal apparatus 200.

The base station 100 then selects a second beam on the basis of the second report information and transmits DL user data using the selected second beam (step S112). For example, the base station 100 transmits the DL user data using the second beam indicated in the second report information.

Then, the terminal apparatus 200 transmits UL user data (step S114), in the case where channel reciprocity is secured, the base station 100 receives the UL user data using the selected second beam (that is, using the second beam which is optimal as the TX beam as the RX beam) (step S116).

(4) Arrangement of Second Resources Individual to UE

Arrangement of the second resources may be individually set for the terminal apparatuses 200. In this case, the second resources are UE specific resources.

Arrangement of the second resources individually set for the terminal apparatuses 200 does not change regardless of which first beam is selected. The base station 100 (for example, the notification unit 153) sets the second resources in advance for each of the terminal apparatuses 200.

In beam association, the base station 100 (for example, the selection unit 151) selects the first beam on the basis of the first report information reported from the terminal apparatus 200. The base station 100 then transmits the second reference signals using the second beams having irradiation ranges obtained by subdividing the irradiation range of the selected first beam in the second resources set in advance. The terminal apparatus 200 can set the second resources set in advance as reception targets regardless of which first beam is selected. Note that the second resources set in advance can be regarded as a resource pool in that it is not determined to which second beams the second resources correspond.

An example of resource setting in the case where the second resources specific to UE are set will be described below with reference to FIG. 17.

Figure 17:
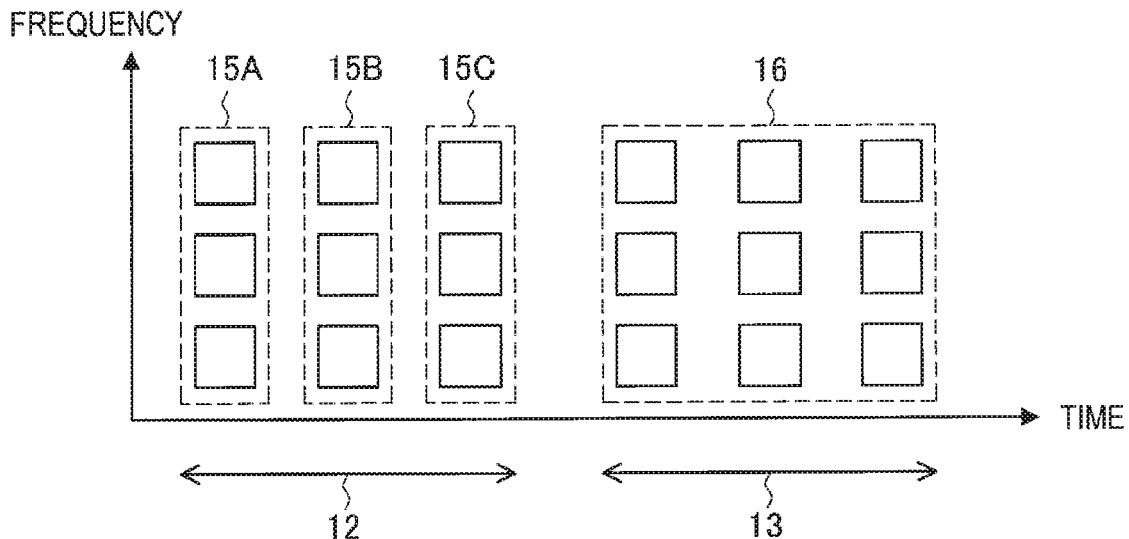
FIG. 17 is a diagram for explaining an example of resource setting according to the first embodiment.

FIG. 17 is a diagram for explaining an example of resource setting according to the present embodiment. FIG. 17 indicates time on a horizontal axis and a frequency on a vertical axis, and one rectangle indicates a resource for a reference signal to be transmitted using one beam.

Resources included in groups 15A to 15C included in a segment 12 are first resources. Further, resources included in a group 16 in a segment 13 are second resources. In the second resources included in the group 16, the second reference signals are transmitted using second beams having irradiation ranges obtained by subdividing irradiation ranges of first beams corresponding to a group for which, for example, received power of the first reference signals is the highest among the groups 15A 15B and 15C.

An example of flow of processing in the case where the second resources specific to UE are set will be described below with reference to FIG. 18.

Figure 18:
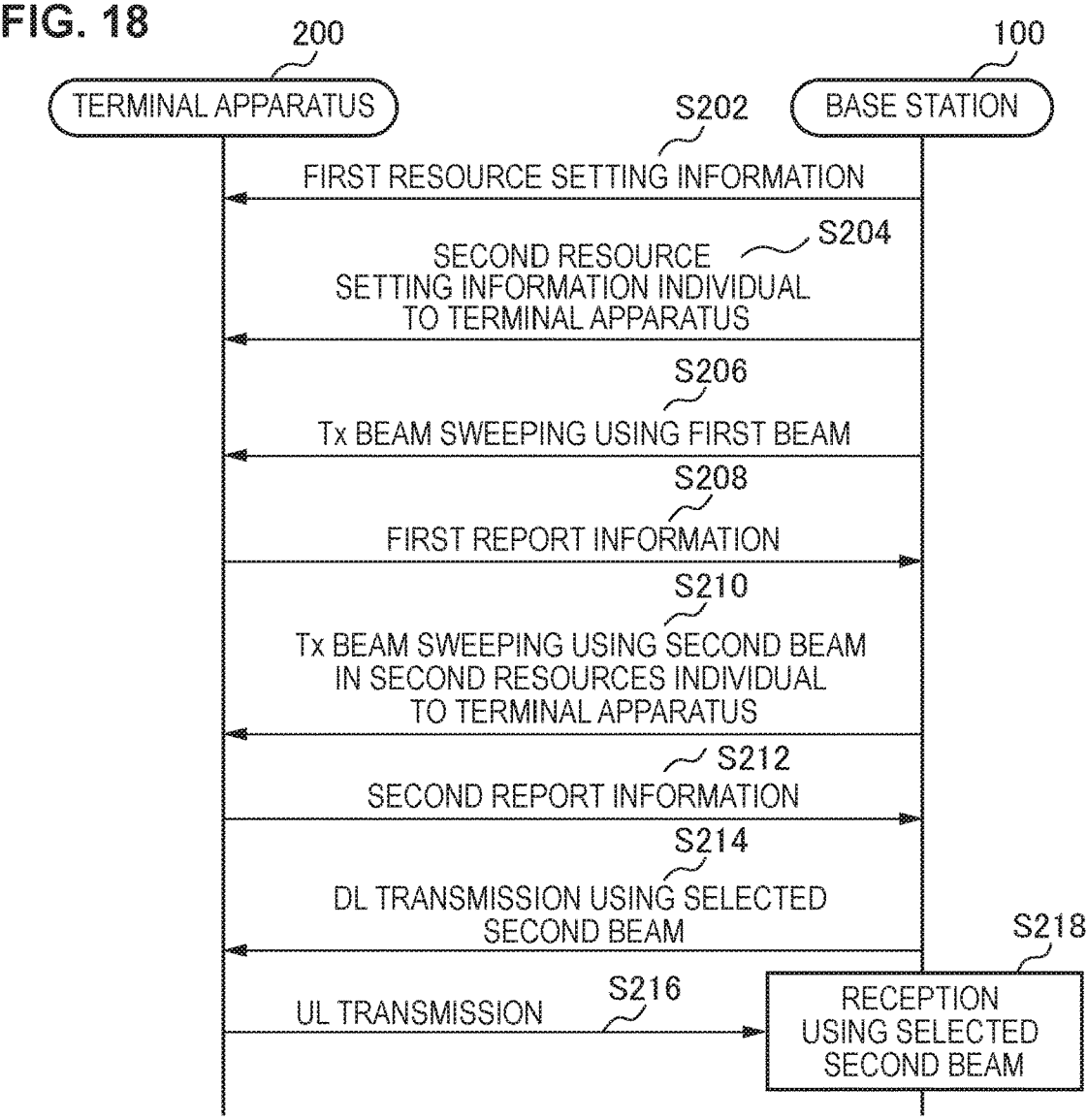
FIG. 18 is a sequence diagram illustrating an example of flow of beam association processing to be executed in a system according to the first embodiment.

FIG. 18 is a sequence diagram illustrating an example of the flow of the beam association processing to be executed in the system 1 according to the present embodiment. As illustrated in FIG. 18, the base station 100 and the terminal apparatus 200 are involved in the present sequence.

First, the base station 100 transmits the first resource setting information to the terminal apparatus 200 (step S202). Further, the base station 100 transmits the second resource setting information specific to the terminal apparatus 200 to the terminal apparatus 200 (S204).

The base station 100 then transmits the first reference signals in the respective first resources indicated in the first resource setting information while performing TX beam sweeping using the first beams (step S206).

The terminal apparatus 200 then reports the first report information including reception results of the first reference signals transmitted using the first beams to the base station 100 (step S208).

The base station 100 then selects the first beam on the basis of the first report information and transmits the second reference signals in the second resources set individually for the terminal apparatuses 200 while performing TX beam sweeping using the second beams having irradiation ranges obtained by subdividing the irradiation range of the selected first beam (step S210). Meanwhile, the terminal apparatus 200 receives the second reference signals in the second resources indicated in the individual second resource setting information.

The terminal apparatus 200 then reports the second report information including reception results of the second reference signals transmitted using the second beams to the base station 100 (step 212).

The base station 100 then selects a second beam on the basis of the second report information and transmits DL user data using the selected second beam (step S214).

Then, the terminal apparatus 200 transmits UL user data (step S216). In the case where channel reciprocity is secured, the base station 100 receives the UL user data using the selected second beam (that is, using the second beam which is optimal as the TX beam as the RX beam) (step S218).

(5) Variability of the Number of Second Beams

The number of second beams having irradiation ranges obtained by subdividing the irradiation range of the first beam may be variable. For example, in the case where there are a number of reflected waves around the terminal apparatus 200, it is preferable that the number of second beams is large. Meanwhile, in the case where line-of-sight communication is possible because there is no reflected wave or power of reflected waves is smaller than power of direct waves, or the like, the number of second beams may be small. Further, in the case where moving speed of the terminal apparatus 200 is high, it is preferable that the number of second beams is large.

Therefore, the base station 100 (for example, the selection unit 151) sets the number of second beams having irradiation ranges obtained by subdividing the irradiation range of the first beam, variable. Specifically, the base station 100 prepares a plurality of types of resource setting which are different in the number of second beams. In the following description, a difference in the number of second beams associated with one first beam will be expressed as a difference in a level of resource setting. It is assumed as an example that the number of second beams is smaller for a higher level of resource setting. The base station 100 (for example, the notification unit 153) notifies the terminal apparatus 200 of the resource setting information for each level. The base station 100 (for example, the selection unit 151) then selects a level of the resource setting on the basis of the first report information. The resource setting for each level will be described below with reference to FIG. 19.

Figure 19:
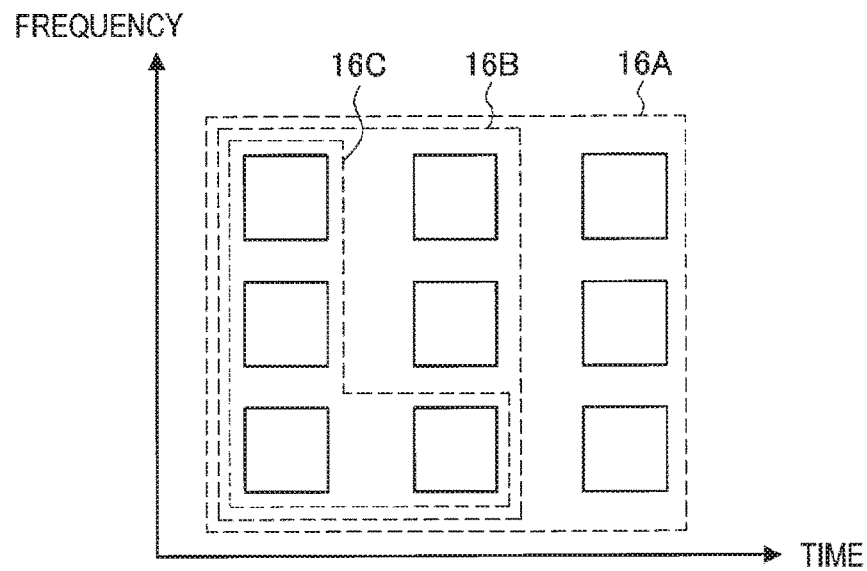
FIG. 19 is a diagram for explaining an example of resource setting according to the first embodiment.

FIG. 19 is a diagram for explaining an example of the resource setting according to the present embodiment. FIG. 19 indicates time on a horizontal axis and a frequency on a vertical axis, and one rectangle indicates a resource for a reference signal to be transmitted using one beam. It is assumed that a certain first resource can be associated with up to 9 resources illustrated in FIG. 19. That is, a case will be assumed where there are nine second beams having irradiation ranges obtained by subdividing the irradiation range of the first beam. In the case where a level 1 is selected, the base station 100 transmits the second reference signals using the second beams in all nine second resources included in the group 16A. That is, the base station 100 transmits the second reference signals using 9 second beams. In the case where a level 2 is selected, the base station 100 transmits the second reference signals using the second beams in six second resources included in the group 16B. That is, the base station 100 transmits the second reference signals using six second beams out of nine second beams and does not use the remaining three beams and second resources. In the case where a level 3 is selected, the base station 100 transmits the second reference signals using the second beams in the second resources included in the group 16C. That is, the base station 100 transmits the second reference signals using four second beams out of nine second beams and does not use the remaining five beams and second resources. Note that, in the case where the level 2 or the level 3 is selected, the base station 100 can use the remaining second resources which are not used for transmission of the second reference signals out of nine second resources, for, for example, transmission and reception of user data.

The terminal apparatus 200 (for example, the selection support unit 243) reports the first report information including level selection support information for supporting level selection at the base station 100 to the base station 100. The level selection support information can include information indicating moving speed of the terminal apparatus 200 or information indicating a level to be requested. Information indicating received power or received quality of the first reference signals may be regarded as the level selection support information.

The base station 100 selects a level of the resource setting on the basis of the level selection support information. For example, the base station 100 selects a high level in the case where the moving speed of the terminal apparatus 200 is high, and selects a low level in the case where the moving speed is low. Note that, in the case where a level is not requested from the terminal apparatus 200, the base station 100 does not have to notify the terminal apparatus 200 of information indicating the selected level. By this means, the terminal apparatus 200 can set minimum necessary resources in accordance with the level as reception targets, so that it is possible to reduce power consumption.

Note that, both in the case where resource setting specific to the base station 100 is set, and in the case where resource setting specific to the terminal apparatus 200 is set, the levels may be variable.

An example of flow of the processing in the case where the levels of the resource setting are variable will be described below with reference to FIG. 20.

Figure 20:
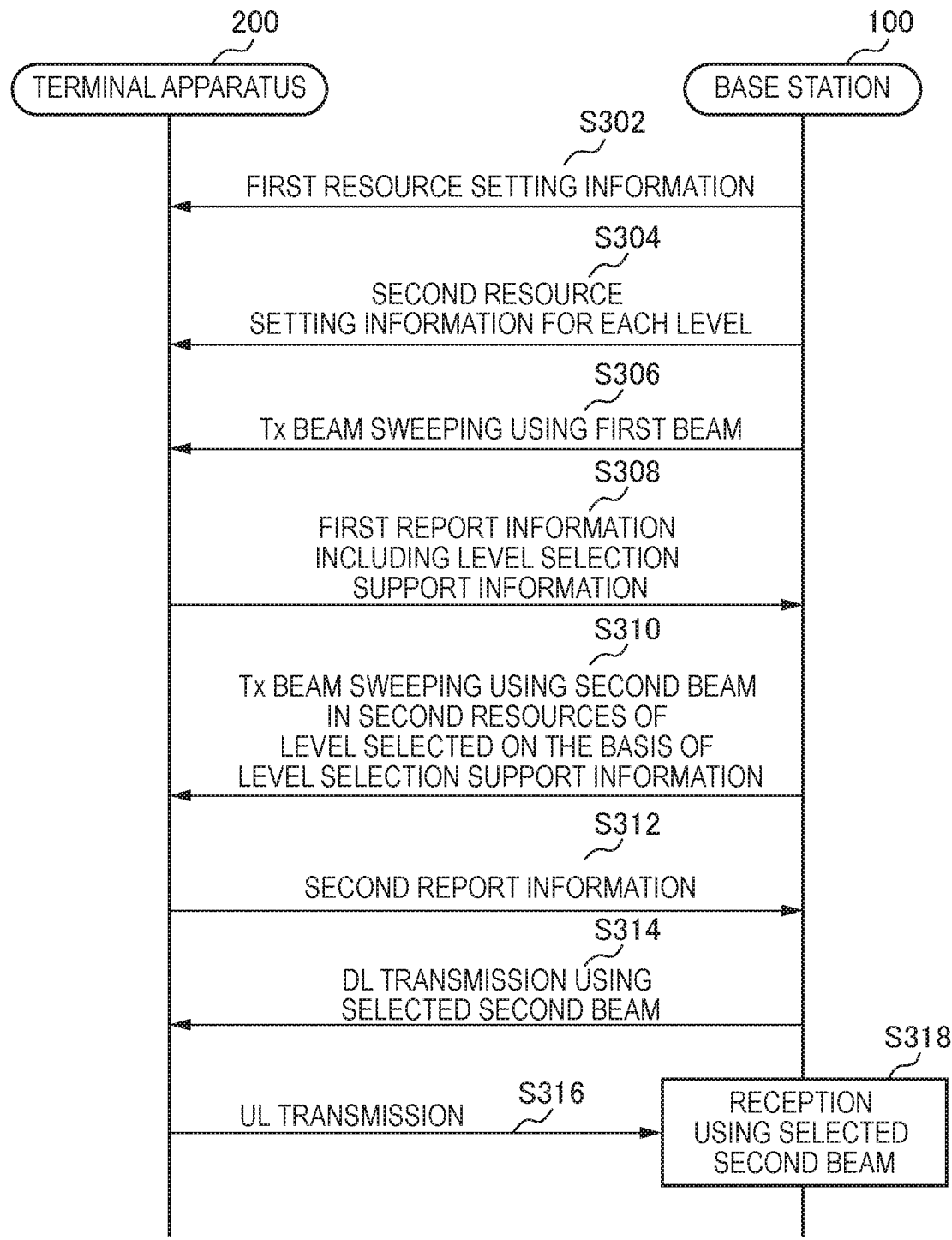
FIG. 20 is a sequence diagram illustrating an example of flow of beam association processing to be executed in a system according to the first embodiment.

FIG. 20 is a sequence diagram illustrating an example of the flow of the beam association processing to be executed in the system 1 according to the present embodiment. As illustrated in FIG. 20, the base station 100 and the terminal apparatus 200 are involved in the present sequence.

First, the base station 100 transmits the first resource setting information to the terminal apparatus 200 (step S302). Further, the base station 100 transmits the second resource setting information for each level to the terminal apparatus 200 (S304). For example, the base station 100 transmits the second resource setting information indicating respective types of resource setting of the levels 1 to 3 to the terminal apparatus 200.

The base station 100 then transmits the first reference signals in the respective first resources indicated in the first resource setting information while performing TX beam sweeping using the first beams (step S306).

The terminal apparatus 200 then reports the first report information including the reception results of the first reference signals transmitted using the first beams and the level selection support information to the base station 100 (step S308). It is assumed here that the level support information includes information indicating a level to be requested.

The base station 100 then transmits the second reference signals in the second resources corresponding to the second resource setting of the level selected on the basis of the received level selection support information while performing TX beam sweeping using the second beams (step S310). It is assumed here that the base station 100 selects a level requested in the level support information. For example, in the case where the base station 100 selects the level 2 concerning the example illustrated in FIG. 19, the base station 100 transmits the second reference signals in six second resources.

The terminal apparatus 200 then receives the second reference signals transmitted using the second beams in the second resources indicated in the resource setting information of the requested level and reports the second report information indicating the reception results to the base station 100 (step 312).

The base station 100 then selects a second beam on the basis of the second report information and transmits DL user data using the selected second beam (step S314).

Then, the terminal apparatus 200 transmits UL user data (step S316). In the case where channel reciprocity is secured, the base station 100 receives the UL user data using the selected second beam (that is, using the second beam which is optimal as the TX beam as the RX beam) (step S318).

4. Second Embodiment

The present embodiment is an embodiment in which the base station 100 selects the first beam through TX beam sweeping, and selects the second beam through RX beam sweeping.

<4.1. Technical Problems>

A case will be assumed where a plurality of base stations 100 performs stepwise beam association on one terminal apparatus 200. In this case, because the terminal apparatus 200 transmits and receives reference signals with respective base stations 100, the number of resources in which the reference signals are to be transmitted and received becomes larger in proportion to the number of base stations 100, and power consumption becomes larger. Therefore, in the case where the plurality of base stations 100 perform stepwise beam association on one terminal apparatus 200, it is preferable that the number of resources in which the reference signals are to be transmitted and received becomes a minimum.

<4.2. Technical Features>

(1) RX Beam Sweeping

An example will be assumed where the plurality of base stations 100 perform beam association on one terminal apparatus 200 at the same time. For example, it is assumed that a serving base station 100A and an adjacent base station 100B exist. Note that, in the case where these base stations are not particularly distinguished, they will be collectively referred to as the base station 100.

First, the base station 100 (for example, the selection unit 151) selects the first beam in a similar manner to the first embodiment. Specifically, each of the base stations 100 transmits first reference signals using the respective plurality of first beams, and selects a first beam on the basis of first report information indicating reception results of the first reference signals reported from the terminal apparatus 200. In the present embodiment, the first reference signals are downlink reference signals transmitted from the base station 100. It is assumed here that the first resources to be used for transmitting the first reference signals are different among the plurality of base stations 100.

The terminal apparatus 200 (for example, the selection support unit 243) reports the first report information indicating reception results of the first reference signals to the base station 100. The terminal apparatus 200 may report the first report information to each of the plurality of base stations 100 or may collectively report a plurality of pieces of the first report information to the serving base station 100A. In the latter case, the serving base station 100A transfers the first report information regarding the first reference signals transmitted from the adjacent base station 100B to the adjacent base station 100B.

The base station 100 then selects the second beam through processing different from that in the second embodiment. Specifically, the base station 100 selects the second beam through RX beam sweeping.

First, the terminal apparatus 200 transmits the second reference signals in a plurality of second resources corresponding to a plurality of second beams having irradiation ranges obtained by subdividing the irradiation range of the first beam selected by the serving base station 100 with reference to the resource setting information indicating arrangement relationship between the first resources and the second resources. For example, the terminal apparatus 200 transmits the second reference signals in a plurality of second resources corresponding to a plurality of second beams having irradiation ranges obtained by subdividing the irradiation range of the first beam selected by the serving base station 100. Meanwhile, the terminal apparatus 200 does not take into account a selection result of the first beam by the adjacent base station 100. By this means, even in the case where there are one or more adjacent base stations 100, because the terminal apparatus 200 only has to transmit the second reference signals in relation to relationship with the serving base station 100 and does not have to transmit the second reference signals many times, it is possible to reduce power consumption. In the present embodiment, the second reference signals are uplink reference signals transmitted from the terminal apparatus 200. Note that the second reference signals may be, for example, sounding reference signals (SRSs).

The base station 100 then receives the second reference signals transmitted from the terminal apparatus 200 in the second resources respectively using a plurality of second beams having irradiation ranges obtained by subdividing the irradiation range of the selected first beam, and selects a second beam on the basis of reception results. For example, the base station 100 selects a second beam used for reception of a second reference signal having the highest received power or received quality among the second reference signals received respectively using the plurality of second beams. In the case where the UL and the DL have channel reciprocity, a TX beam corresponding to the selected appropriate RX beam becomes a TX beam appropriate for communication with the terminal apparatus 200.

Here, the serving base station 100 and the adjacent base station 100 receive the second reference signals in common second resources. To realize this, the serving base station 100 notifies the adjacent base station 100 of information indicating the second resources and receives the second reference signals in the second resources. Meanwhile, the adjacent base station 100 receives the second reference signals in the second resources of the serving base station 100 on the basis of the notification from the serving base station 100. Specifically, the serving base station 100 requests the adjacent base station 100 to receive the second reference signals in the resources which are the same as those of the serving base station 100. This request will be also referred to as a second resource setting request. The adjacent base station 100 receives the second reference signals transmitted from the terminal apparatus 200 in the resources indicated in the notified second resource setting request. Even in the case where the antenna architecture on the base station 100 side is analog/digital hybrid, a plurality of base stations 100 can receive the second reference signals in the same second resources. Because a plurality of base stations 100 receives the second reference signals in the same second resources in this manner, the terminal apparatus 200 does not have to transmit the second reference signals many times, so that it is possible to reduce power consumption.

The serving base station 100 notifies the terminal apparatus 200 of the second resource setting information. The serving base station 100 may make a notification of the second resource setting information after selecting a first beam or may make a notification in advance.

In the former case, a notification of the second resource setting information in which a selection result of the first beam is reflected, that is, indicating the second resources which are determined to be reception targets, is made. In other words, the serving base station 100 notifies the terminal apparatus 200 of the information indicating the second resources in which the terminal apparatus 200 should transmit the second reference signals after the first beam is selected. In this case, the terminal apparatus 200 only has to transmit the second reference signals in the second resources indicated in the second resource setting information as instructed by the base station 100.

In the latter case, a notification of the second resource setting information in which the selection result of the first beam is not reflected, that is, which can be reception targets, is made. In other words, the bass station 100 notifies the terminal apparatus 200 of the information indicating candidates for the second resources in which the terminal apparatus 200 should transmit the second reference signals before the first beam is selected. In this case, the terminal apparatus 200 selects a first beam by the terminal apparatus 200, specifies the second resources on the basis of the selection result, and transmits the second reference signals in the specified second resources. In this case, the base station 100 does not have to notify the terminal apparatus 200 again if the base station 100 notifies the terminal apparatus 200 of the second resource setting information once.

Flow of these kinds of processing will be described with reference to FIG. 21 and FIG. 22.

First Example

Figure 21:
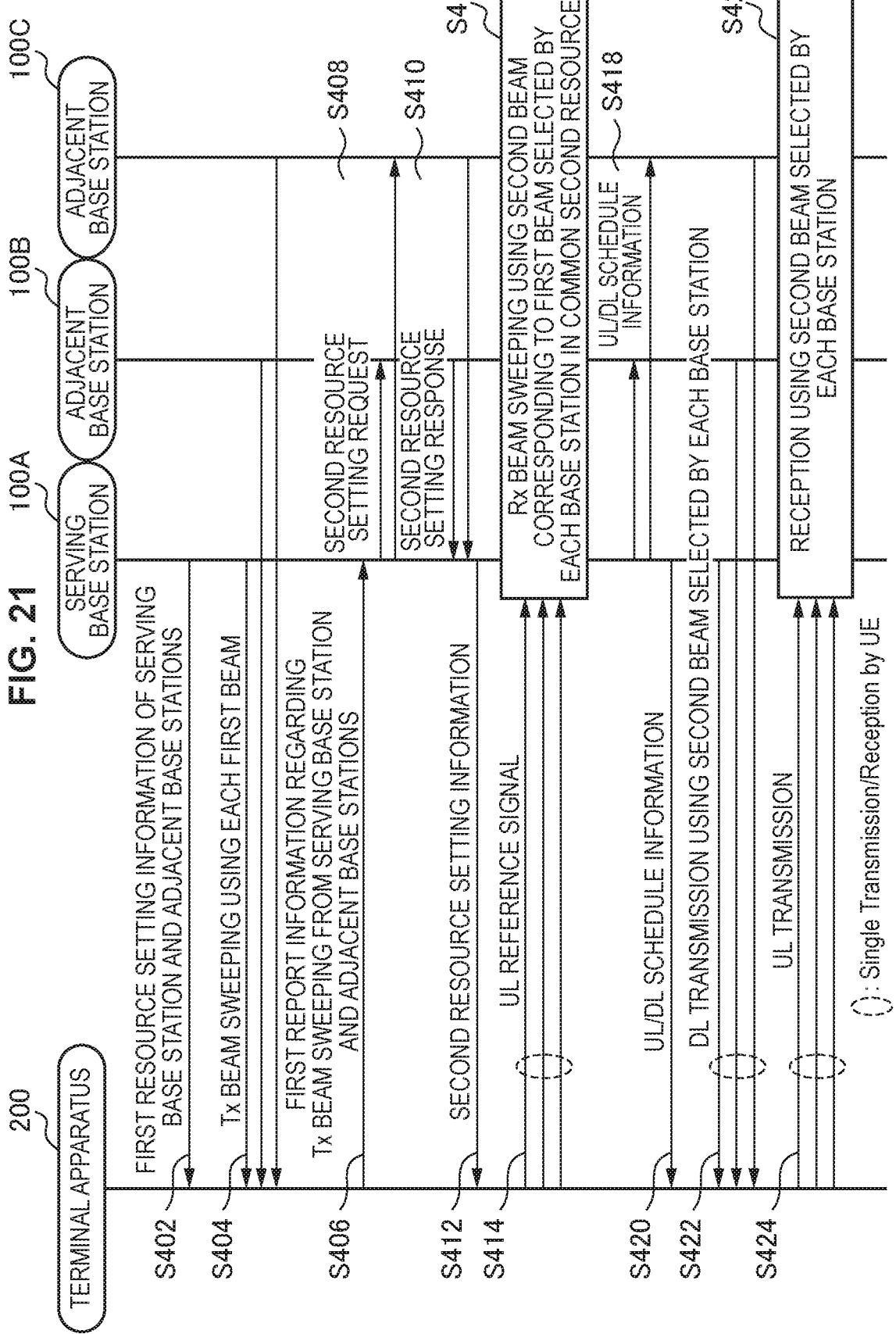
FIG. 21 is a sequence diagram illustrating an example of flow of beam association processing to be executed in a system according to a second embodiment.

FIG. 21 is a sequence diagram illustrating an example of flow of the beam association processing to be executed in the system 1 according to the present embodiment. The present sequence is an example in the case where a notification of the second resource setting information is made after the first beam is selected. As illustrated in FIG. 21, the serving base station 100A, the adjacent base station 100B, the adjacent base station 100C and the terminal apparatus 200 are involved in the present sequence.

First, the serving base station 100A transmits the first resource setting information of the serving base station 100A, the adjacent base stations 100B and 100C to the terminal apparatus 200 (step S402).

The serving base station 100A, the adjacent base stations 100B and 100C then transmit the first reference signals in the first resources indicated in the first resource setting information while performing TX beans sweeping using the respective first beams (step S404). This TX beam sweeping may be performed using TX beam sweeping patterns specific to the respective base stations.

The terminal apparatus 200 then reports the first report information including reception results of the first reference signals transmitted using the first beams from the serving base station 100A and the adjacent base stations 100B and 100C to the serving base station 100A (step S406).

The serving base station 100A then selects a first beam on the basis of the first report information and sets the second resources corresponding to the second beams having irradiation ranges obtained by subdividing the irradiation range of the first beam as the second resources for receiving the second reference signals from the terminal apparatus 200. The serving base station 100A then transmits the second resource setting request which requests for reception of the second reference signals to the adjacent base stations 100B and 100C in a similar manner in the second resources in which the serving base station 100A receives the second reference signals (step S408).

The adjacent base stations 100B and 100C then returns a second resource setting response to the serving base station 100A (step S410). Here, in the case where the adjacent base stations 100B and 100C approve the second resource setting request, the adjacent base stations 100B and 100C sets the second resources indicated in the second resource setting request as reception targets and returns the second resource setting response including information indicating that setting is OK. On the other hand, in the case where the adjacent base stations 100B and 100C do not approve the second resource setting request, the adjacent base stations 100B and 100C return the second resource setting response including information indicating that setting is NG. In a case of NG, the serving base station 100, and the adjacent base stations 100B and 100C exchange messages for negotiation as to which resources are to be used as the second resources.

The serving base station 100A then transmits the second resource setting information to the terminal apparatus 200 (step S412). This second resource setting information includes information indicating common second resources in which the serving base station 100A and the adjacent base stations 100B and 100C receive the second reference signals.

The terminal apparatus 200 then transmits the second reference signals in uplink in resources indicated in the second resource setting information (step S414). Note that transmission by the terminal apparatus 200 described here is transmission of one time which is not accompanied by beam forming.

Meanwhile, the serving base station 100A, and the adjacent base stations 100B and 100C receive the second reference signals in the common second resources while performing RX beam sweeping using the second beams having irradiation ranges obtained by subdividing the irradiation ranges of the first beams respectively selected by the base stations (step S416). In this event, the serving base station 100A, and the adjacent base stations 100B and 100C select second beams appropriate for the respective base stations to perform communication with the terminal apparatus 200 on the basis of reception results of the second reference signals. The adjacent base stations 100 and 100C may notify the serving base station 100A of the selection results.

The serving base station 100A then notifies the adjacent base stations 100B and 100C (step S418) and notifies the terminal apparatus 200 (step S420) of uplink and downlink schedule information.

The serving base station 100A, the adjacent base stations 100 and 100C then transmit user data in downlink using the second beams respectively selected by the base stations in the resources indicated in the scheduling information (step S422). The terminal apparatus 200 receives the user data in the resources indicated in the schedule information. Note that reception by the terminal apparatus 200 described here is reception of one time which is not accompanied by beam forming.

The terminal apparatus 200 then transmits user data in uplink in the resources indicated in the schedule information (step S424). Note that transmission by the terminal apparatus 200 described here is transmission of one time which is not accompanied by beam forming.

The serving base station 100A, and the adjacent base stations 100B and 100C then receive the user data from the terminal apparatus 200 in the respective resources indicated in the schedule information using the second beams respectively selected by the base stations (step S426).

Second Example

Figure 22:
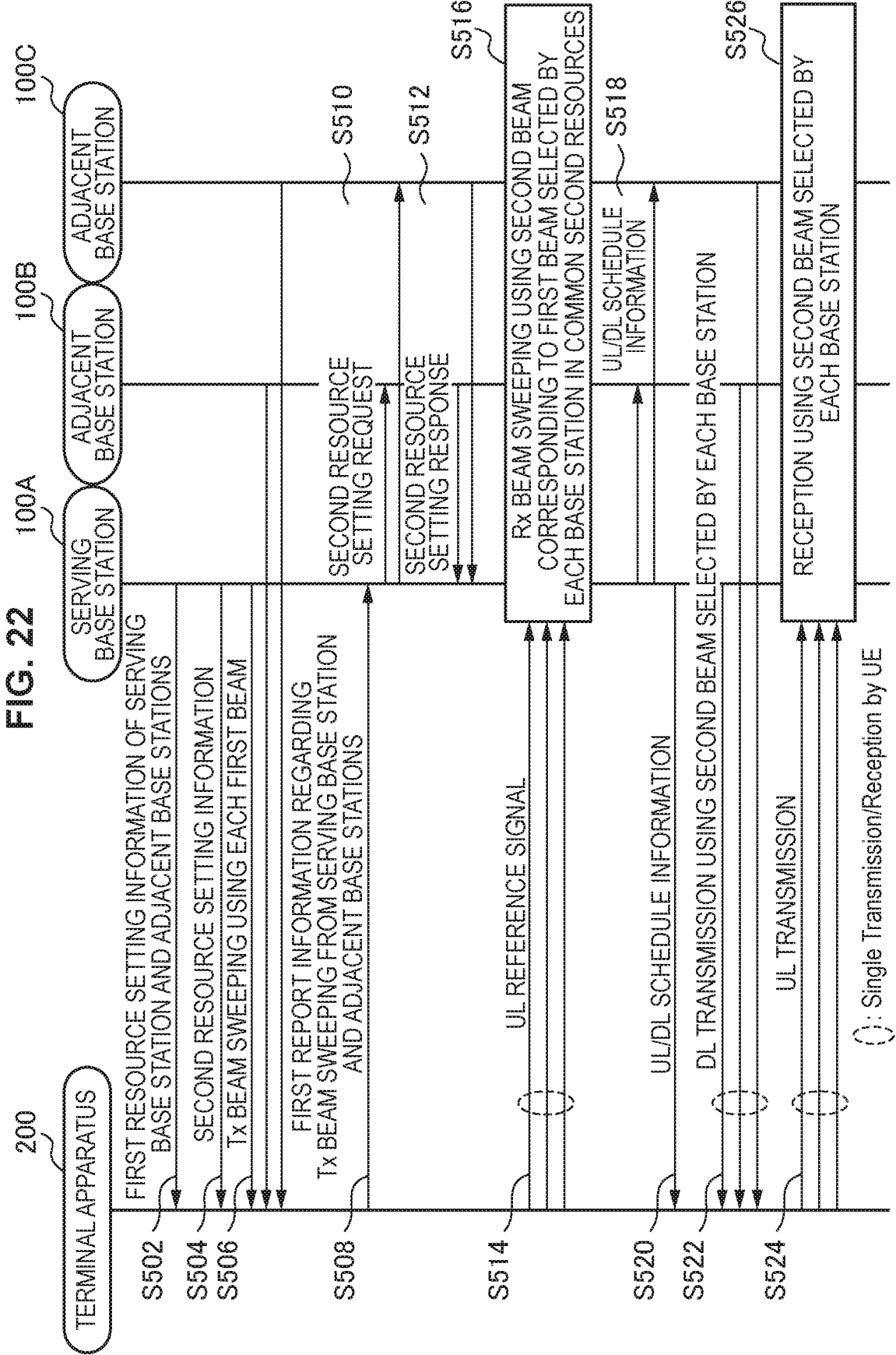
FIG. 22 is a sequence diagram illustrating an example of flow of beam association processing to be executed in a system according to the second embodiment.

FIG. 22 is a sequence diagram illustrating an example of flow of the beam association processing to be executed in the system 1 according to the present embodiment. The present sequence is an example in the case where a notification of the second resource setting information is made before the first beam is selected. As illustrated in FIG. 22, the serving base station 100A, the adjacent base station 100B, the adjacent base station 100C and the terminal apparatus 200 are involved in the present sequence.

First, the serving base station 100A transmits the first resource setting information of the serving base station 100A, the adjacent base stations 100B and 100C to the terminal apparatus 200 (step S502).

The serving base station 100A then transmits the second resource setting information to the terminal apparatus 200 (step S504). This second resource setting information includes information indicating candidates for common second resources in which the serving base station 100A and the adjacent base stations 100B and 100C receive the second reference signals.

The serving base station 100A, the adjacent base stations 100B and 100C then transmit the first reference signals in the first resources indicated in the first resource setting information while performing TX beam sweeping using the respective first beams (step S506). This TX beam sweeping may be performed using TX beam sweeping patterns specific to the respective base stations.

The terminal apparatus 200 then reports the first report information including reception results of the first reference signals transmitted using the first beams from the serving base station 100A and the adjacent base stations 100B and 100C to the serving base station 100A (step S508).

The serving base station 100A then selects a first beam on the basis of the first report information and sets the second resources corresponding to the second beams having irradiation ranges obtained by subdividing the irradiation range of the first beam as the second resources for receiving the second reference signals from the terminal apparatus 200. The serving base station 100A then transmits the second resource setting request which requests for reception of the second reference signals to the adjacent base stations 100B and 100C in a similar manner in the second resources in which the serving base station 100A receives the second reference signals (step S510).

The adjacent base stations 100B and 100C then returns a second resource setting response to the serving base station 100A (step S512). Here, in the case where the adjacent base stations 100B and 100C approve the second resource setting request, the adjacent base stations 100B and 100C sets the second resources indicated in the second resource setting request as reception targets and returns the second resource setting response including information indicating that setting is OK. On the other hand, in the case where the adjacent base stations 100B and 100C do not approve the second resource setting request, the adjacent base stations 100B and 100C return the second resource setting response including information indicating that setting is NG. In a case of NG, the serving base station 100, and the adjacent base stations 100B and 100C exchange messages for negotiation as to which resources are to be used as the second resources.

The terminal apparatus 200 then transmits the second reference signals in the second resources selected on the basis of the second resource setting information (step S514). For more detail, first, the terminal apparatus 200 selects an appropriate first beam among the first beams of the serving base station 100 on the basis of reception results of the first reference signals from the serving base station 100. The terminal apparatus 200 then transmits the second reference signals in the second resources corresponding to the second beams having irradiation ranges obtained by subdividing the irradiation range of the selected first beam of the serving base station 100 among candidates for the second resources indicated in the second resource setting information. Note that transmission by the terminal apparatus 200 described here is transmission of one time which is not accompanied by beam forming.

Meanwhile, the serving base station 100A, and the adjacent base stations 100B and 100C receive the second reference signals in the common second resources while performing RX beam sweeping using the second beams having irradiation ranges obtained by subdividing the irradiation ranges of the first beams respectively selected by the base stations (step S516). In this event, the serving base station 100A, and the adjacent base stations 100B and 100C select second beams appropriate for the respective base stations to perform communication with the terminal apparatus 200 on the basis of reception results of the second reference signals. The adjacent base stations 100 and 100C may notify the serving base station 100A of the selection results.

The serving base station 100A then notifies the adjacent base stations 100B and 100C (step S518) and notifies the terminal apparatus 200 (step S520) of uplink and downlink schedule information.

The serving base station 100A, the adjacent base stations 100 and 100C then transmit user data in downlink using the second beams respectively selected by the base stations in the resources indicated in the scheduling information (step S522). The terminal apparatus 200 receives the user data in the resources indicated in the schedule information. Note that reception by the terminal apparatus 200 described here is reception of one time which is not accompanied by beam forming.

The terminal apparatus 200 then transmits user data in uplink in the resources indicated in the schedule information (step S524). Note that transmission by the terminal apparatus 200 described here is transmission of one time which is not accompanied by beam forming.

The serving base station 100A, and the adjacent base stations 100B and 100C then receive the user data from the terminal apparatus 200 in the respective resources indicated in the schedule information using the second beams respectively selected by the base stations (step S526).

(2) Resource Setting

There can be a variety of resource setting. An example of the resource setting will be described below with reference to FIG. 23 to FIG. 27.

First Example

Figure 23:
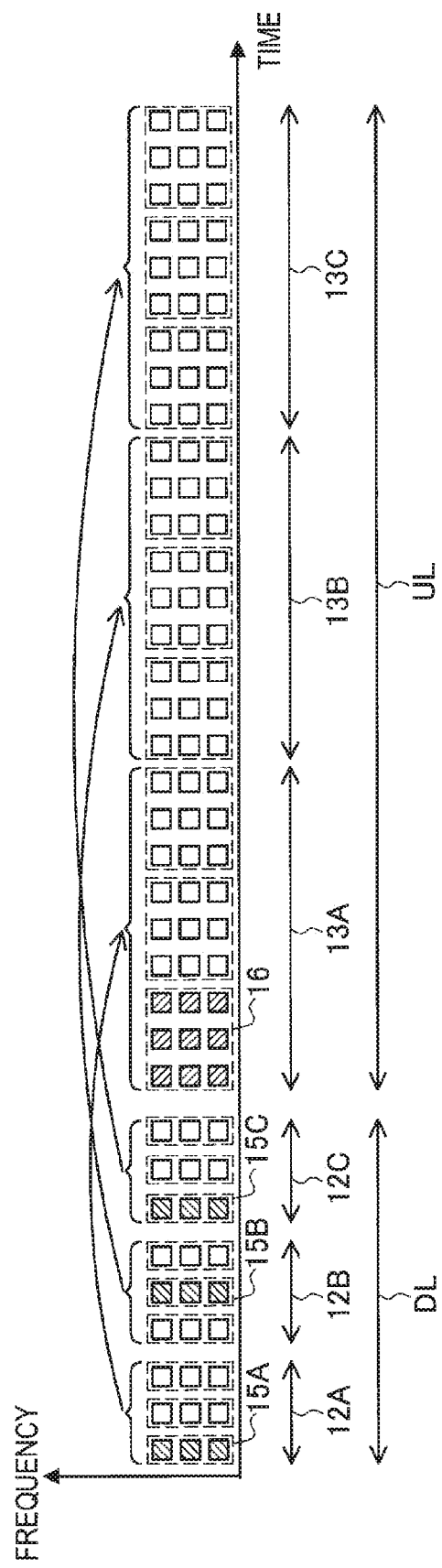
FIG. 23 is a diagram for explaining an example of resource setting according to the second embodiment.

FIG. 23 is a diagram for explaining an example of the resource setting according to the present embodiment. FIG. 23 indicates time on a horizontal axis and a frequency on a vertical axis, and one rectangle indicates a resource for a reference signal to be transmitted using one beam. Resources included in segments 12A to 12C are first resources, and are used for transmitting and receiving the first references signals in DL. Further, resources included in segments 13A to 13C are second resources, and are used for transmitting and receiving the second reference signals in UL. The resources included in the segments 12A and 13A are used by, for example, the serving base station 100A, and the first resources included in the segment 12A are associated with the second resources included in the segment 13A. The resources included in the segments 12B and 13B are used by, for example, the adjacent base station 100B, and the first resources included in the segment 12B are associated with the second resources included in the segment 13B. The resources included in the segments 12C and 13C are used by, for example, the adjacent base station 100C, and the first resources included in the segment 12C are associated with the second resources included in the segment 13C.

As illustrated in FIG. 23, the resources of the respective base stations 100 may be separated in a time domain. In other words, the serving base station 100A may multiplex the first resources and the second resources of the serving base station 100A with the first resources and the second resources of other adjacent base stations 100B and 100C in a time direction. Here, the resources are set for each base station 100 because the terminal apparatuses 200 to which the base stations 100 are to be connected are different for each base station 100, and the base stations 100 with which the terminal apparatuses 200 coordinate (that is, perform beam association) are different for each terminal apparatus 200. In the case where the plurality of base stations 100 use common resources, there is a case where unnecessary interference occurs by beam sweeping performed by the respective base stations 100, and procedure of beam sweeping does not work well.

It is assumed in the example illustrated in FIG. 23 that the serving base station 100A selects a first beam corresponding to the first resource included in the group 15A. The terminal apparatus 200 transmits the second reference signals in the second resources included in the group 16 associated with the first resource included in the group 15A corresponding to the first beam selected by the serving base station 100A. The serving base station 100A then receives the second reference signals in the second resources included in the group 16. Meanwhile, it is assumed that the adjacent base station 100B selects a first beam corresponding to the first resource included in the group 15B, and the adjacent base station 100C selects a first beam corresponding to the first resource included in the group 15C. The adjacent base stations 100B and 100C receive the second reference signals in the second resources included in the group 16 in common with the serving base station 100A regardless of selection results of the first beams by the adjacent base stations 100B and 100C. Because a plurality of base stations 100 receives the second reference signals in the same second resources in this manner, the terminal apparatus 200 does not have to transmit the second reference signals many times, so that it is possible to reduce power consumption.

Second ExampleE

Figure 24:
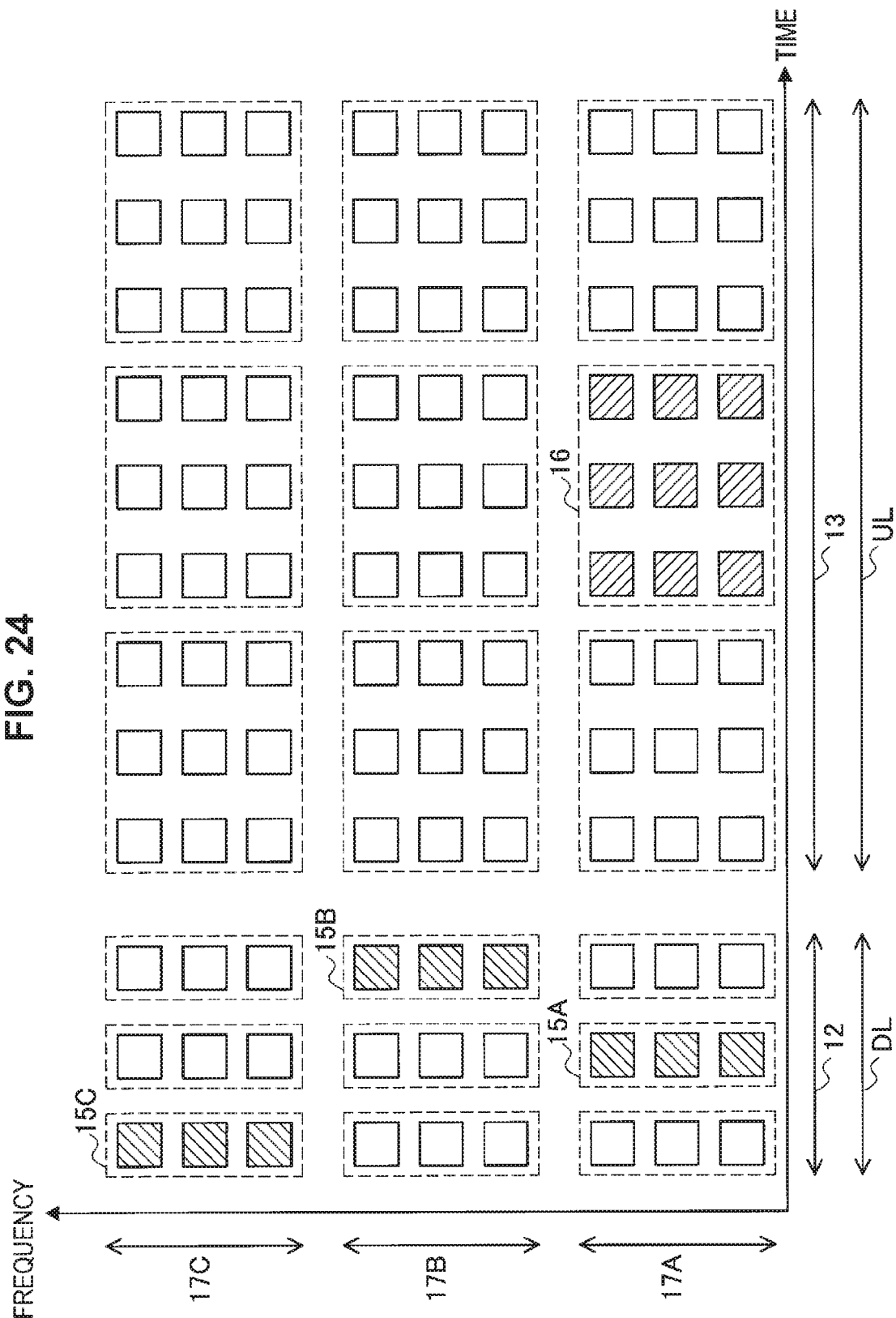
FIG. 24 is a diagram for explaining an example of resource setting according to the second embodiment.

FIG. 24 is a diagram for explaining an example of the resource setting according to the present embodiment. FIG. 24 indicates time on a horizontal axis and a frequency on a vertical axis, and one rectangle indicates a resource for a reference signal to be transmitted using one beam. Resources included in a segment 12 are first resources, and are used for transmitting and receiving the first reference signals in DL. Further, resources included in a segment 13 are second resources, and are used for transmitting and receiving the second reference signals in UL. Resources included in a frequency band 17A are mainly used by the serving base station 100A, and the first resources included in the frequency band 17A and the segment 12 are associated with the second resources included in the frequency band 17A and the segment 13. Resources included in a frequency band 17B are mainly used by the adjacent base station 100B, and the first resources included in the frequency band 17B and the segment 12 are associated with the second resources included in the frequency band 17B and the segment 13. Resources included in a frequency band 17C are mainly used by the adjacent base station 100C, and the first resources included in the frequency band 17C and the segment 12 are associated with the second resources included in the frequency band 17C and the segment 13.

As illustrated in FIG. 24, the resources of the respective base stations 100 may be separated in a frequency domain. In other words, the serving base station 100A may multiplex the first resources and the second resources of the serving base station 100A with the first resources and the second resources of other adjacent base stations 100B and 100C in a frequency direction.

It is assumed in the example illustrated in FIG. 24 that the serving base station 100A selects a first beam corresponding to the first resource included in the group 15A, The terminal apparatus 200 transmits the second reference signals in the second resources included in the group 16 associated with the first resource included in the group 15A corresponding to the first beam selected by the serving base station 100A. The serving base station 100A then receives the second reference signals in the second resources included in the group 16. Meanwhile, it is assumed that the adjacent base station 100B selects a first beam corresponding to the first resource included in the group 15B, and the adjacent base station 100C selects a first beam corresponding to the first resource included in the group 15C. The adjacent base stations 100B and 100C receive the second reference signals in the second resources included in the group 16 in common with the serving base station 100A regardless of selection results of the first beams by the adjacent base stations 100B and 100C. Because a plurality of base stations 100 receives the second reference signals in the same second resources in this manner, the terminal apparatus 200 does not have to transmit the second reference signals many times, so that it is possible to reduce power consumption.

Third Example

Figure 25:
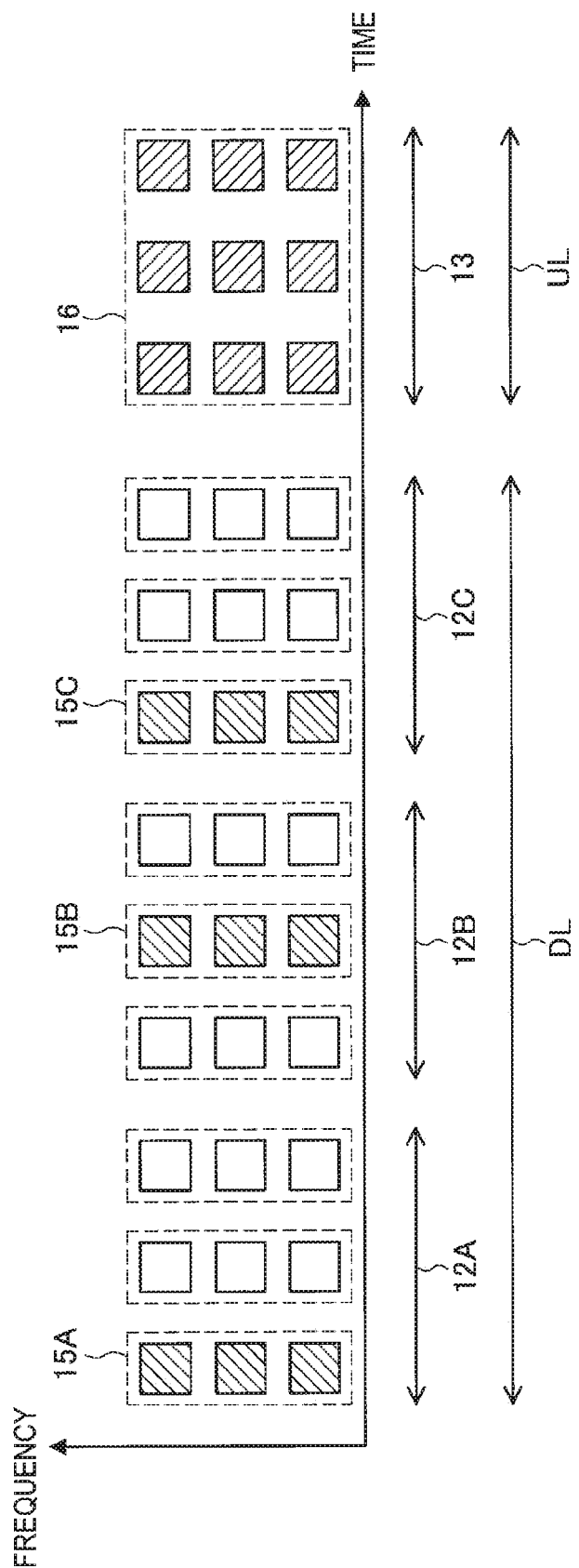
FIG. 25 is a diagram for explaining an example of resource setting according to the second embodiment.

FIG. 25 is a diagram for explaining an example of the resource setting according to the present embodiment. FIG. 25 indicates time on a horizontal axis and a frequency on a vertical axis, and one rectangle indicates a resource for a reference signal to be transmitted using one beam. The resources included in the segments 12A to 12C and included in the respective groups are the first resources, and are used for transmitting and receiving the first reference signals in DL. Further, the resources included in the segment 13 and included in the group 16 are the second resources, and are used for transmitting and receiving the second reference signals in UL. The resources included in the group 16 are set, as the second resources, individually to the terminal apparatuses 200 and commonly to the plurality of base station 100.

It is assumed in the example illustrated in FIG. 25 that the serving base station 100A selects a first beam corresponding to a first resource included in the group 15A. The terminal apparatus 200 transmits the second reference signals in the second resources included in the group 16 individually set by the serving base station 100A. The serving base station 100A then receives the second reference signals in the second resources included in the group 16 individually set to the terminal apparatuses 200 regardless of a selection result of the first beam by the serving base station 100A. Meanwhile, it is assumed that the adjacent base station 100B selects a first beam corresponding to a first resource included in the group 15B, and the adjacent base station 100C selects a first beam corresponding to a first resource included in the group 15C. The adjacent base stations 100B and 100C receive the second reference signals in the second resources included in the group 16 individually set to the terminal apparatuses 200 regardless of selection results of the first beams by the adjacent base stations 100B and 100C. Because a plurality of base stations 100 receives the second reference signals in the same second resources in this manner, the terminal apparatus 200 does not have to transmit the second reference signals many times, so that it is possible to reduce power consumption.

Fourth Example

While FIG. 25 illustrates an example where the first resources of the plurality of base stations 100 are multiplexed in a time direction, the first resources may be multiplexed in a frequency direction. An example of the resource setting in this case will be described with reference to FIG. 26.

Figure 26:
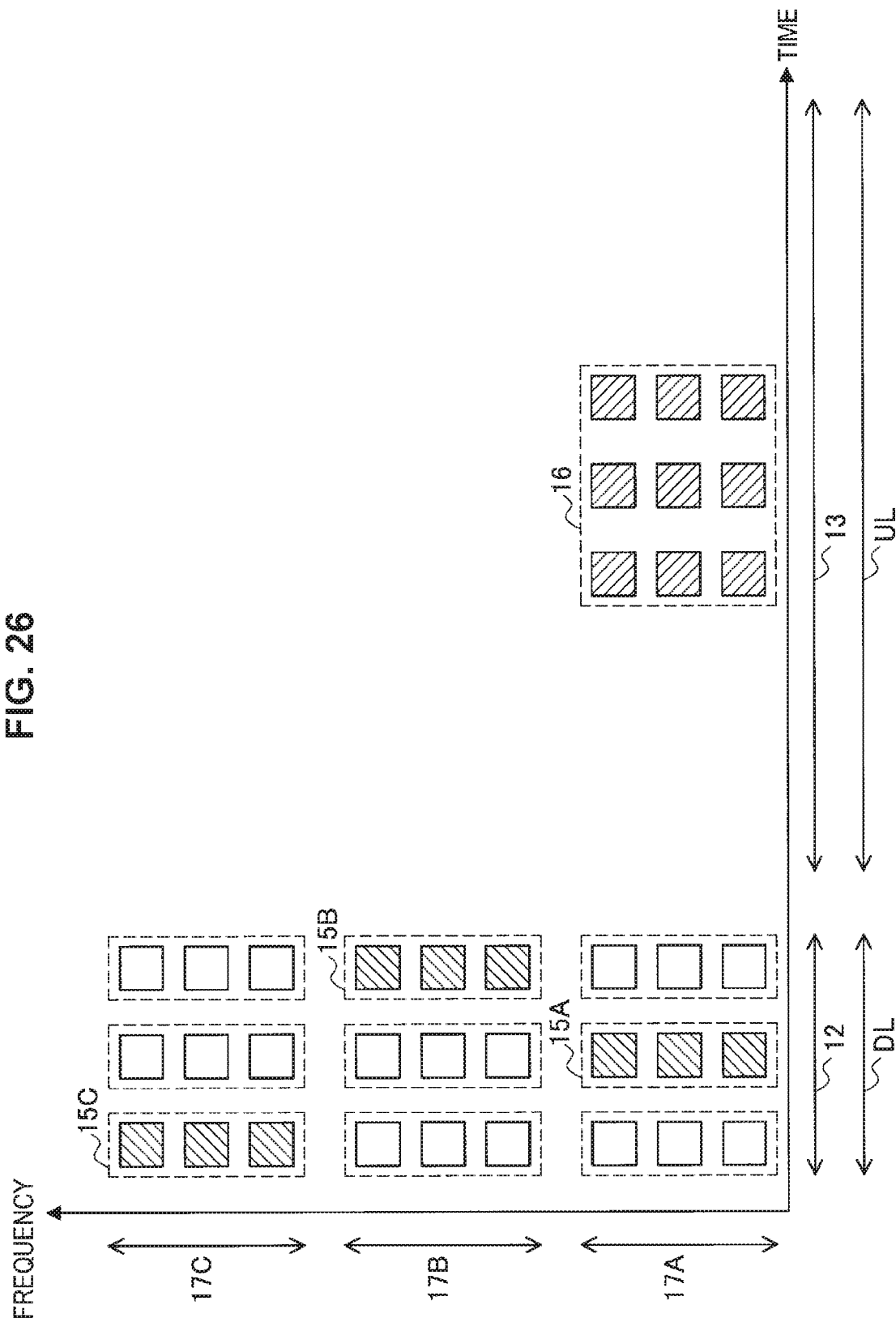
FIG. 26 is a diagram for explaining an example of resource setting according to the second embodiment.

FIG. 26 is a diagram for explaining an example of the resource setting according to the present embodiment. FIG. 26 indicates time on a horizontal axis and a frequency on a vertical axis, and one rectangle indicates a resource for a reference signal to be transmitted using one beam. Resources included in segment 12 are first resources, and are used for transmitting and receiving the first references signals in DL. Further, resources included in segment 13 are second resources, and are used for transmitting and receiving the second reference signals in UL. Resources included in the frequency band 17A are mainly used by the serving base station 100A. Resources included in the frequency band 17B are mainly used by the adjacent base station 100B. Resources included in the frequency band 17C are mainly used by the adjacent base station 100C. Here, resources included in the group 16 are set, as the second resources, individually for the terminal apparatuses 200 and commonly to the plurality of base station 100.

It is assumed in the example illustrated in FIG. 26 that the serving base station 100A selects a first beam corresponding to a first resource included in the group 15A. The terminal apparatus 200 transmits the second reference signals in the second resources included in the group 16 set by the serving individual. The serving base station 100A then receives the second reference signals in the second resources included in the group 16 individually set to the terminal apparatuses 200 regardless of a selection result of the first beam by the serving base station 100A. Meanwhile, it is assumed that the adjacent base station 100B selects a first beam corresponding to a first resource included in the group 15B, and the adjacent base station 100C selects a first beam corresponding to a first resource included in the group 15C. The adjacent base stations 100B and 100C receive the second reference signals in the second resources included in the group 16 individually set to the terminal apparatuses 200 regardless of selection results of the first beams by the adjacent base stations 100B and 100C. Because a plurality of base stations 100 receives the second reference signals in the same second resources in this manner, the terminal apparatus 200 does not have to transmit the second reference signals many times, so that it is possible to reduce power consumption.

Fifth Example

While an example where the second resources are collected at one location has been described above, a plurality of the second resources may be set. In other words, a plurality of second resources may be provided for one second beam. In this case, the terminal apparatus 200 transmits the second reference signals a plurality of times. There is a case where it is difficult for the base station 100 to receive the second reference signals transmitted in resources at one location from the terminal apparatus 200 depending on states of the resources. Concerning this point, by the second reference signals being transmitted in resources at a plurality of locations, the base station 100 can receive the second reference signals more reliably and can select the second beam. This becomes more effective as the number of base stations 100 which perform beam association on one terminal apparatus 200 increases. An example of the resource setting in this case will be described with reference to FIG. 27.

Figure 27:
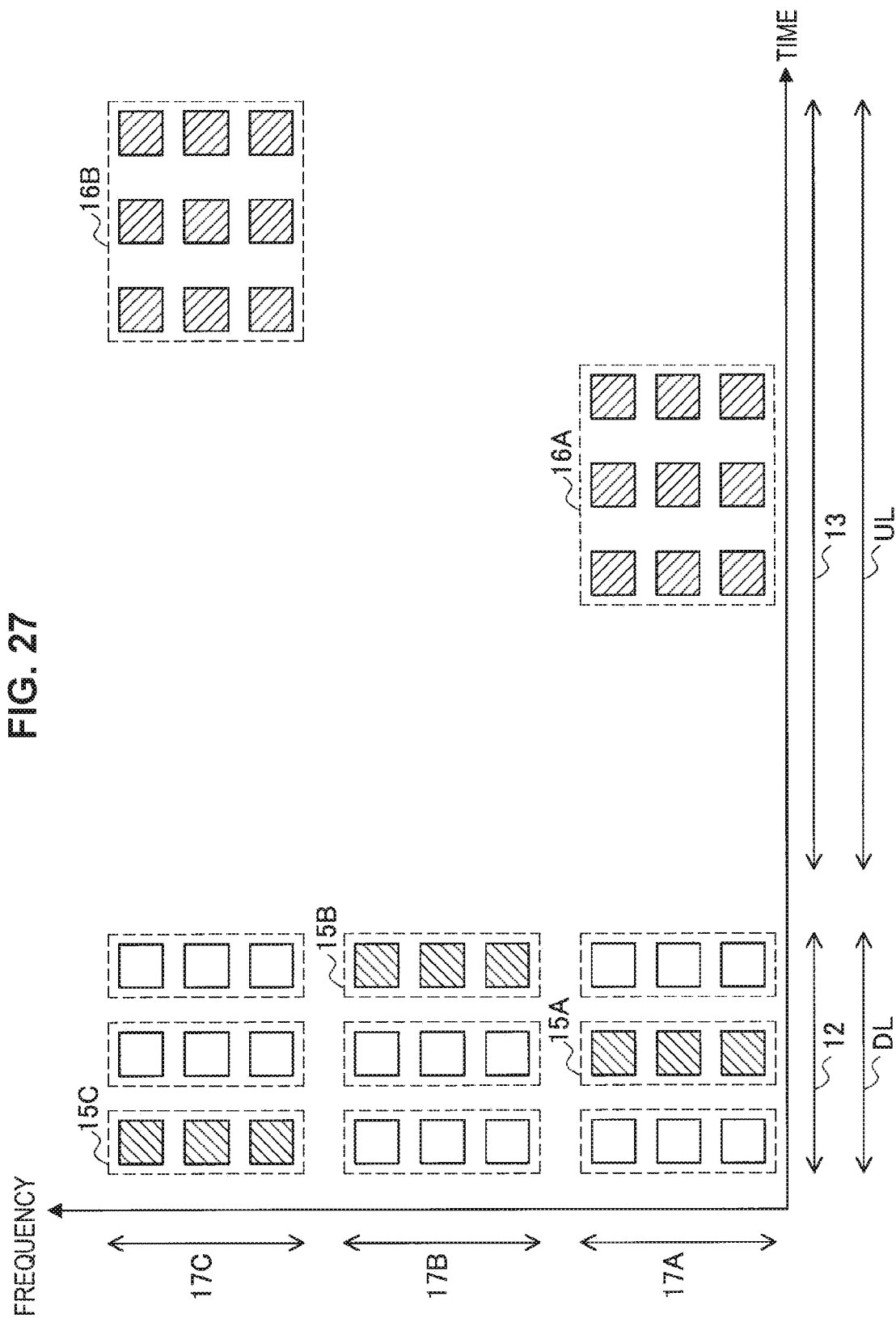
FIG. 27 is a diagram for explaining an example of resource setting according to the second embodiment.

FIG. 27 is a diagram for explaining an example of the resource setting according to the present embodiment. FIG. 27 indicates time on a horizontal axis and a frequency on a vertical axis, and one rectangle indicates a resource for a reference signal to be transmitted using one beam. Resources included in segment 12 are first resources, and are used for transmitting and receiving the first references signals in DL. Further, resources included in segment 13 are second resources, and are used for transmitting and receiving the second reference signals in UL. Resources included in the frequency band 17A are mainly used by the serving base station 100A. Resources included in the frequency band 17B are mainly used by the adjacent base station 100B. Resources included in the frequency band 17C are mainly used by the adjacent base station 100C. Here, resources included in the groups 16A and 16B are set, as the second resources, individually for the terminal apparatuses 200 and commonly to the plurality of base station 100.

It is assumed in the example illustrated in FIG. 27 that the serving base station 100A selects a first beam corresponding to a first resource included in the group 15A. The terminal apparatus 200 transmits the second reference signals in the second resources included in the groups 16A and 16B set by the serving individual. The serving base station 100A then receives the second reference signals in the second resources included in at least any one of the groups 16A or 16B individually set to the terminal apparatuses 200 regardless of a selection result of the first beam by the serving base station 100A. Meanwhile, it is assumed that the adjacent base station 100B selects a first beam corresponding to a first resource included in the group 15B, and the adjacent base station 100C selects a first beam corresponding to a first resource included in the group 15C. The adjacent base stations 100B and 100C receive the second reference signals in the second resources included in at least any one of the groups 16A or 16B individually set to the terminal apparatuses 200 regardless of selection results of the first beams by the adjacent base stations 100B and 100C. Because a plurality of base stations 100 receives the second reference signals in the same second resources in this manner, the terminal apparatus 200 does not have to transmit the second reference signals many times, so that it is possible to reduce power consumption.

5. Application Examples

The technology according to the present disclosure is applicable to a variety of products. For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control wireless communication, and one or more remote radio heads (RRH) disposed in a different place from the main body. Additionally, various types of terminals to be discussed later may also operate as the base station 100 by temporarily or semi-permanently executing a base station function.

For example, a terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, the terminal apparatus 200 may be a wireless communication module (such as an integrated circuit module including a single die) mounted on each of the terminals.

<5.1. Application Examples Regarding Base Station>
(First Application Example)

Figure 28:
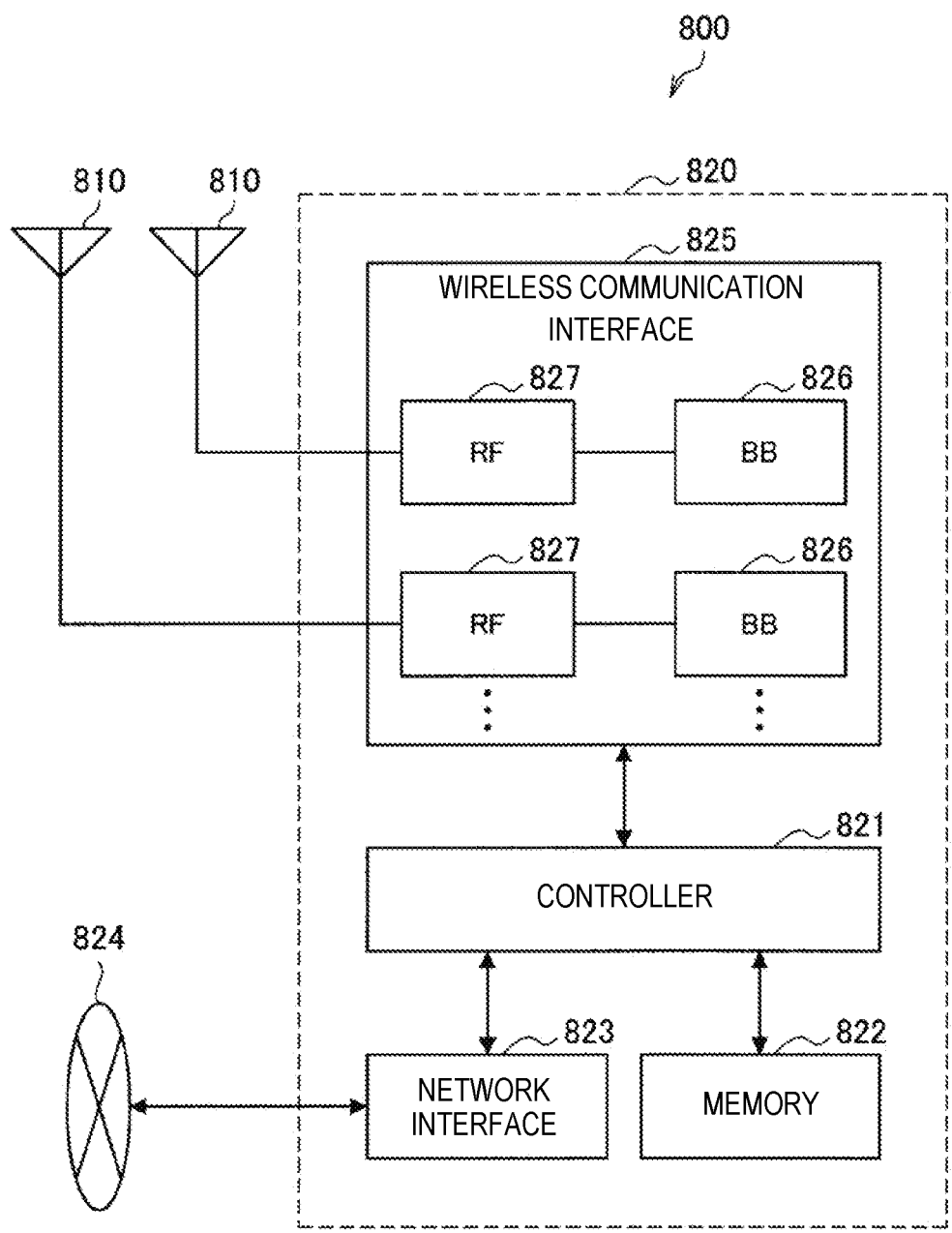
FIG. 28 is a block diagram illustrating a first example of a schematic configuration of an eNB.

FIG. 28 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 28. For example, the multiple antennas 810 may be compatible with multiple frequency bands used by the eNB 800. Although FIG. 28 illustrates the example in which the eNB 800 includes the multiple antennas 810, the eNB 800 may also include a single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 28. For example, the multiple BB processors 826 may be compatible with multiple frequency bands used by the eNB 800. The wireless communication interface 825 may include the multiple RF circuits 827, as illustrated in FIG. 28. For example, the multiple RF circuits 827 may be compatible with multiple antenna elements. Although FIG. 28 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 28, one or more components (the selection unit 151, the notification unit 153, and/or the communication control unit 155) included in the processing unit 150 described with reference to FIG. 11 may he mounted in the wireless communication interface 825. Alternatively, at least some of such components may be mounted in the controller 821. As an example, in the eNB 800, a module including a part (for example, the BB processor 826) or all of the wireless communication interface 825 and/or the controller 821 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 800, and the wireless communication interface 825 (for example, the BB processor 826) and/or the controller 821 may execute the program. As described above, the eNB 800, the base station apparatus 820 or the module may be provided as an apparatus including the one or more components, and a program causing a processor to function as the one or more components may be provided. In addition, a readable recording medium recording the program may be provided.

In addition, the wireless communication unit 120 described with reference to FIG. 11 may be mounted in the wireless communication interface 825 (for example, the RF circuit 827) in the eNB 800 shown in FIG. 28. In addition, the antenna unit 110 may be mounted in the antenna 810. In addition, the network communication unit 130 may be mounted in the controller 821 and/or the network interface 823. In addition, the storage unit 140 may be mounted in the memory 822.

(Second Application Example)

Figure 29:
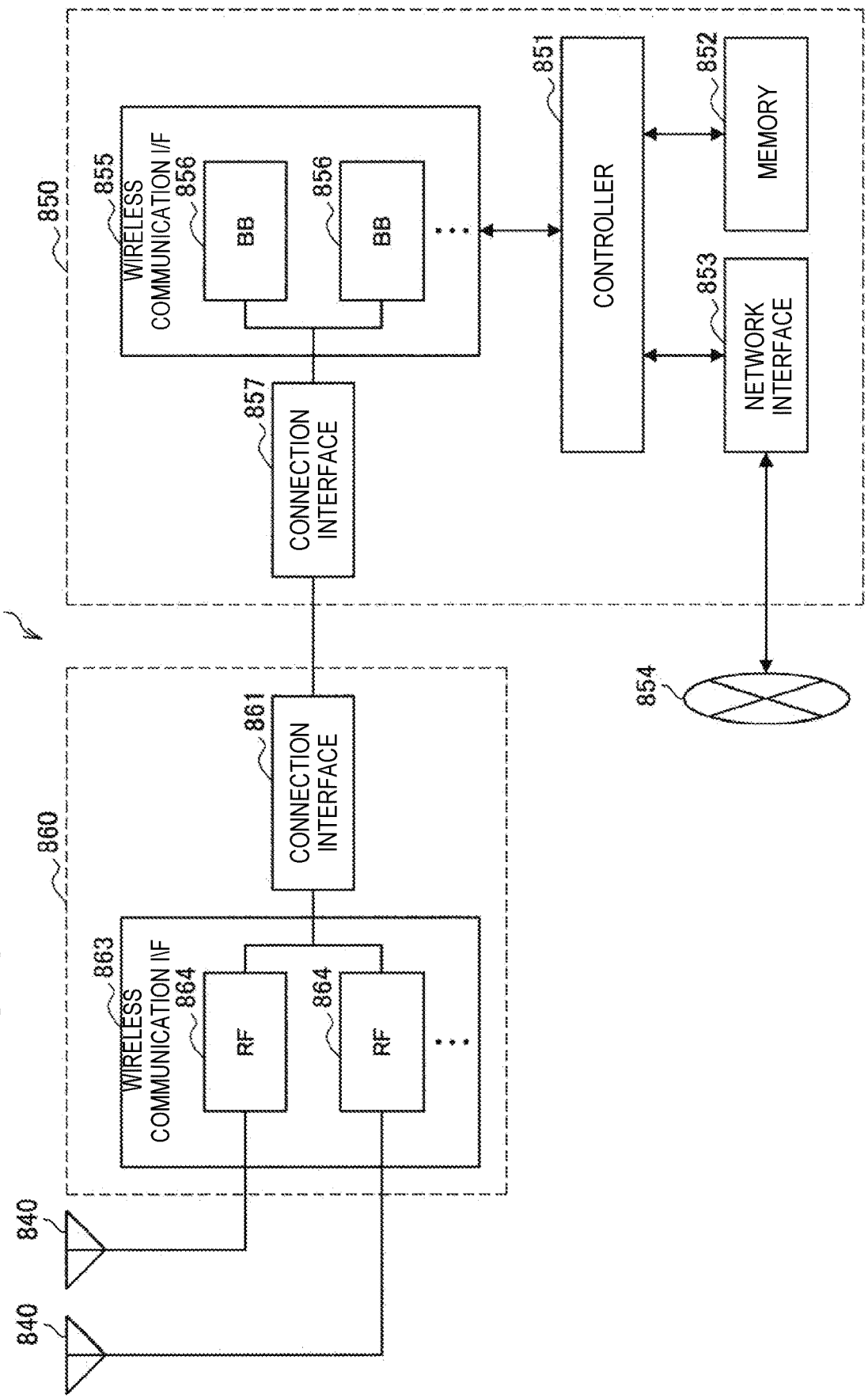
FIG. 29 is a block diagram illustrating a second example of a schematic configuration of an eNB.

FIG. 29 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 29. For example, the multiple antennas 840 may be compatible with multiple frequency bands used by the eNB 830. Although FIG. 29 illustrates the example in which the eNB 830 includes the multiple antennas 840, the eNB 830 may also include a single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 28.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 28, except the BB processor 856 is connected to the RF circuit 864 of the RRH 860 via the connection interface 857. The wireless communication interface 855 may include the multiple BB processors 856 as illustrated in FIG. 29. For example, the multiple BB processors 856 may be compatible with multiple frequency bands used by the eNB 830. Although FIG. 29 illustrates the example in which the wireless communication interface 855 includes the multiple BB processors 856, the wireless communication interface 855 may also include a single BB processor 856.

The connection interface 857 is an interface for connecting the base station apparatus 850 (wireless communication interface 855) to the RRH 860. The connection interface 857 may also be a communication module for communication in the above-described high speed line that connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 29. For example, the multiple RF circuits 864 may support multiple antenna elements. Although FIG. 29 illustrates the example in which the wireless communication interface 863 includes the multiple RF circuits 864, the wireless communication interface 863 may also include a single RF circuit 864.

In the eNB 830 shown in FIG. 29, one or more components (the selection unit 151, the notification unit 153, and/or the communication control unit 155) included in the processing unit 150 described with reference to FIG. 11 may be mounted in the wireless communication interface 855 and/or the wireless communication interface 863. Alternatively, at least some of such components may be mounted in the controller 851. As an example, in the eNB 830, a module including a part (for example, the BB processor 856) or all of the wireless communication interface 855 and/or the controller 851 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the eNB 830, and the wireless communication interface 855 (for example, the BB processor 856) and/or the controller 851 may execute the program. As described above, the eNB 830, the base station apparatus 850 or the module may be provided as an apparatus including the one or more components, and a program causing a processor to function as the one or more components may be provided. In addition, a readable recording medium recording the program may be provided.

In addition, for example, the wireless communication unit 120 described with reference to FIG. 11 may be mounted in the wireless communication interface 863 (for example, the RF circuit 864) in the eNB 830 shown in FIG. 29. In addition, the antenna unit 110 may be mounted in the antenna 840. In addition, the network communication unit 130 may be mounted in the controller 851 and/or the network interface 853. In addition, the storage unit 140 may be mounted in the memory 852.

<5.2. Application Examples Regarding Terminal Apparatus>

(First Application Example)

Figure 30:
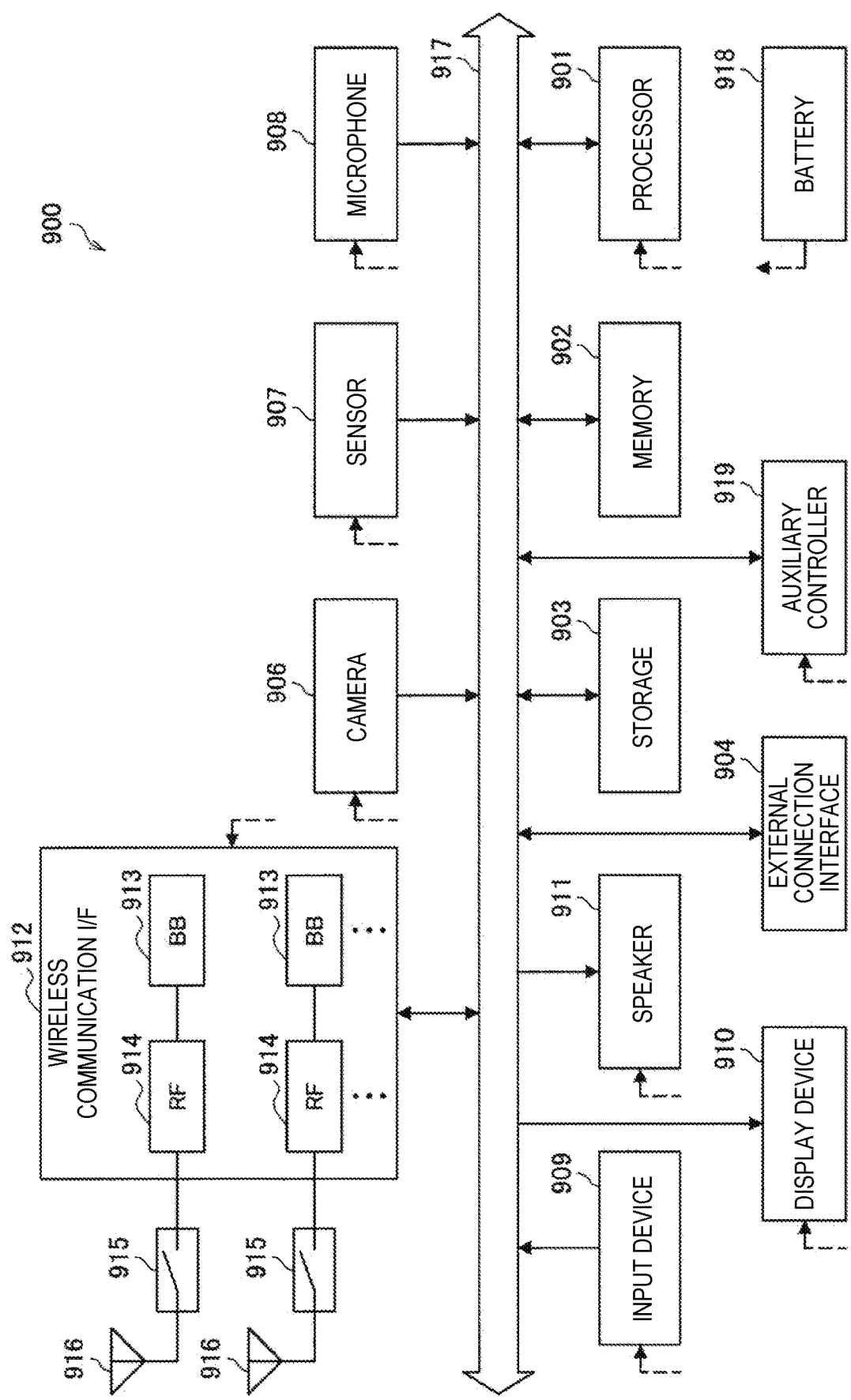
FIG. 30 is a block diagram illustrating an example of a schematic configuration of a smartphone.

FIG. 30 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 30. Although FIG. 30 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 30. Although FIG. 30 illustrates the example in which the smartphone 900 includes the multiple antennas 916, the smartphone 900 may also include a single antenna. 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 30 via feeder lines, which are partially shown as dashed lines in the figure. The auxiliary controller 919 operates a minimum necessary function of the smartphone 900, for example, in a sleep mode.

In the smartphone 900 shown in FIG. 30, one or more components (the acquisition unit 241 and/or the selection support unit 243) included in the processing unit 240 described with reference to FIG. 12 may be mounted in the wireless communication interface 912. Alternatively, at least some of such components may be mounted in the processor 901 or the auxiliary controller 919. As an example, in the smartphone 900, a module including a part (for example, the BB processor 913) or all of the wireless communication interface 912, the processor 901, and/or the auxiliary controller 919 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the smartphone 900, and the wireless communication interface 912 (for example, the BB processor 913), the processor 901, and/or the auxiliary controller 919 may execute the program. As described above, the smartphone 900, or the module may be provided as an apparatus including the one or more components, and a program causing a processor to function as the one or more components may be provided. In addition, a readable recording medium recording the program may be provided.

In addition, for example, the wireless communication unit 220 described with reference to FIG. 12 may be mounted in the wireless communication interface 912 (for example, the RF circuit 914) in the smartphone 900 shown in FIG. 30. In addition, the antenna unit 210 may be mounted in the antenna 916. In addition, the storage unit 230 may be mounted in the memory 902.

(Second Application Example)

Figure 31:
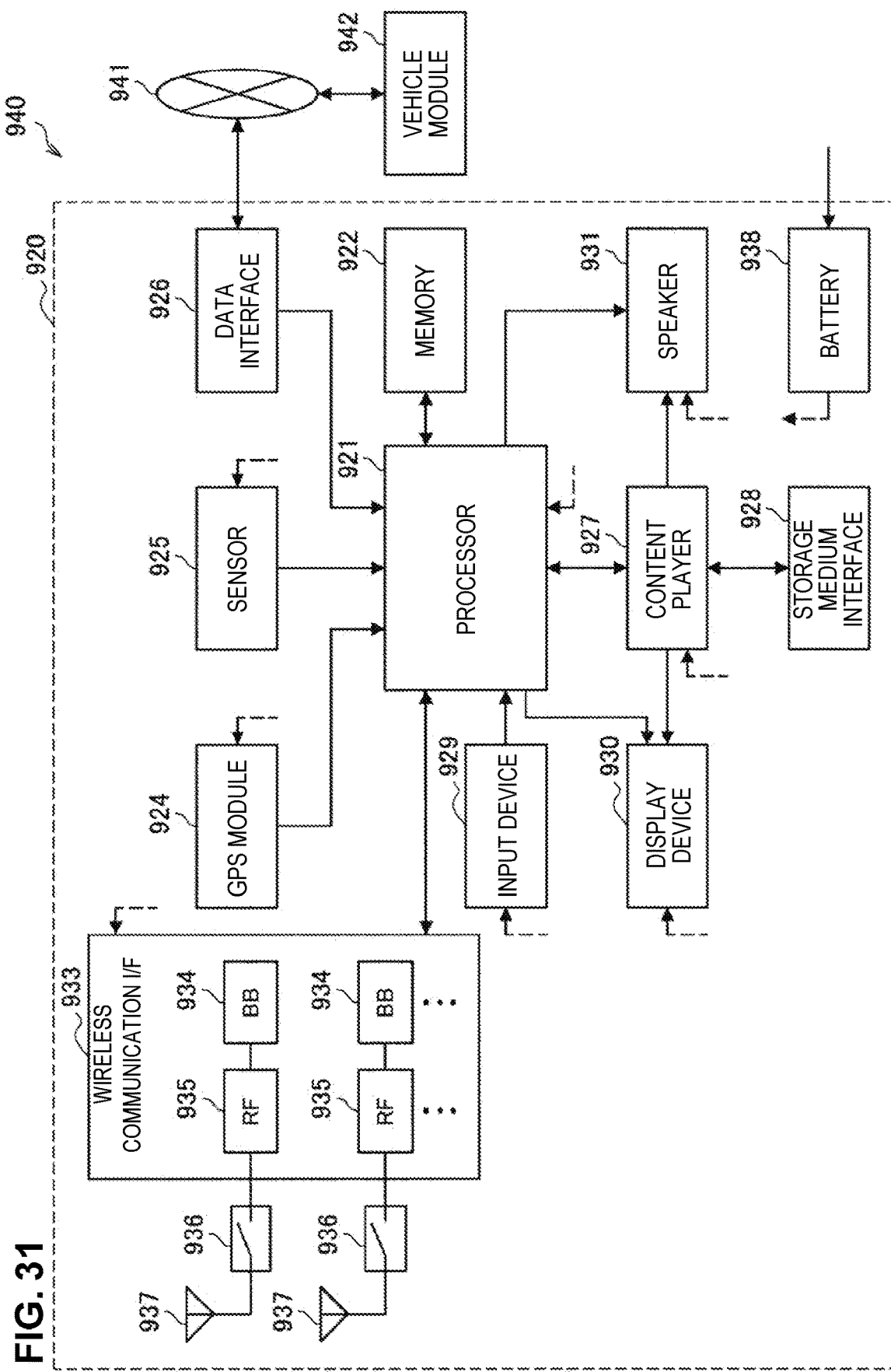
FIG. 31 is a block diagram illustrating an example of a schematic configuration of a car navigation apparatus.

FIG. 31 is a block diagram illustrating an example of a schematic configuration of a car navigation apparatus 920 to which the technology of the present disclosure may be applied. The car navigation apparatus 920 includes a processor 921, a memory 922., a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 31. Although FIG. 31 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation apparatus 920 may include the multiple antennas 937, as illustrated in FIG. 31. Although FIG. 31 illustrates the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 31 via feeder lines that are partially shown as dashed lines in the figure. The battery 938 accumulates power supplied from the vehicle.

In the car navigation apparatus 920 shown in FIG. 31, one or more components (the acquisition unit 241 and/or the selection support unit 243) included in the processing unit 240 described with reference to FIG. 12 may be mounted in the wireless communication interface 933. Alternatively, at least some of such components may be mounted in the processor 921. As an example, in the car navigation apparatus 920, a module including a part (for example, the BB processor 934) or all of the wireless communication interface 933, and/or the processor 921 is installed and the one or more components may be mounted in the module. In this case, the module may store a program causing a processor to function as the one or more components (in other words, a program causing a processor to execute operations of the one or more components) and execute the program. As another example, a program causing a processor to function as the one or more components is installed in the car navigation apparatus 920, and the wireless communication interface 933 (for example, the BB processor 934), and/or the processor 921 may execute the program. As described above, the car navigation apparatus 920, or the module may be provided as an apparatus including the one or more components, and a program causing a processor to function as the one or more components may be provided. In addition, a readable recording medium recording the program may be provided.

In addition, for example, the wireless communication unit 220 described with reference to FIG. 12 may be mounted in the wireless communication interface 933 (for example, the RF circuit 935) in the car navigation apparatus 920 shown in FIG. 31. In addition, the antenna unit 210 may be mounted in the antenna 937. In addition, the storage unit 230 may be mounted in the memory 922.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

6. Conclusion

An embodiment of the present disclosure has been described in detail above with reference to FIG. 1 to FIG. 31. As described above, the base station 100 according to the present embodiment selects a second beam appropriate for communication with the terminal apparatus 200 on the basis of reception results of a plurality of second reference signals which are transmitted or received using a plurality of second beams having irradiation ranges obtained by subdividing an irradiation range of a first beam which is appropriate for communication with the terminal apparatus 200, and which is selected on the basis of reception results of a plurality of first reference signals transmitted using a plurality of first beams which are formed by a plurality of antennas and which are set in advance. In this manner, because the base station 100 according to the present embodiment performs stepwise beam association, it is possible to perform efficient beam selection.

Further, the base station 100 notifies the terminal apparatus 200 of information indicating arrangement relationship between a plurality of first resources corresponding to a plurality of first beams for the first reference signals and a plurality of second resources corresponding to a plurality of second beams for the second reference signals. The terminal apparatus 200 then performs processing of supporting selection of the second beams by the base station 100 on the basis of the resource setting information indicating the notified arrangement relationship between the first resources and the second resources. The terminal apparatus 200 according to the present embodiment can reduce power consumption of the terminal apparatus 200 by performing the processing for supporting selection of the second beam at the base station 100 on the basis of the resource setting information.

For more detail, the terminal apparatus 200 can receive the second reference signals in limited locations of the second resources corresponding to the second beams having irradiation ranges obtained by subdividing an irradiation range of the selected first beam by referring to the resource setting information. In this manner, the terminal apparatus 200 can reduce power consumption by suppressing the number of resources in which the second reference signals are to be received. Further, the terminal apparatus 200 can recognize locations of the second resources corresponding to the second beams having irradiation ranges obtained by subdividing an irradiation range of the selected first beam by referring to the resource setting information without being notified from the base station 100. Therefore, the terminal apparatus 200 can reduce power consumption by omitting processing of acquiring the locations of the second resources from the base station 100.

The preferred embodiment of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, at least the first reference signals are transmitted from the base station 100 to the terminal apparatus 200, and the first beams are selected through TX beam sweeping, the present technology is not limited to such an example. The first reference signals may be transmitted from the terminal apparatus 200 to the base station 100. In this case, the base station 100 selects a first beam through RX beam sweeping. Thereafter, the base station 100 may select a second beam through TX beam sweeping or may select a second beam through RX beam sweeping. However, because it is considered cumbersome to perform negotiation as to which resources are to be used as the first resources among a plurality of base stations 100, it is preferable that the base station 100 selects a first beam through TX beam sweeping.

Further, while, in the above-described embodiment, description has been provided assuming that the base station 100 selects a TX beam or an RX beam, the present technology is not limited to such an example. Te terminal apparatus 200 may select a TX beam or an RX beam using a similar technology.

Note that it is not necessary for the processing described in this specification with reference to the sequence diagram to be executed in the order shown in the sequence diagram. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A base station including: a selection unit configured to select a second beam appropriate for communication with a terminal apparatus on the basis of reception results of a plurality of second reference signals transmitted or received using a plurality of second beams having irradiation ranges obtained by subdividing an irradiation range of a first beam which is appropriate for communication with the terminal apparatus and which is selected on the basis of reception results of a plurality of first reference signals transmitted using a plurality of first beams which are formed by a plurality of antennas and which are set in advance; and a notification unit configured to notify the terminal apparatus of information indicating arrangement relationship between a plurality of first resources corresponding to a plurality of the first beams for the first reference signals and a plurality of second resources corresponding to a plurality of the second beams for the second reference signals.

(2)

The base station according to (1), in which the selection unit transmits the first reference signals using each of a plurality of the first beams, selects the first beam on the basis of first report information indicating reception results of the first reference signals reported from the terminal apparatus, transmits the second reference signals respectively using a plurality of the second beams having irradiation ranges obtained by subdividing an irradiation range of the selected first beam, and selects the second beam on the basis of second report information indicating reception results of the second reference signals reported from the terminal apparatus.

(3)

The base station according to (1) or (2), in which the selection unit transmits the first reference signals respectively using a plurality of the first beams, transmits the second reference signals respectively using a plurality of the second beams having irradiation ranges obtained by subdividing an irradiation range of each of a plurality of the first beams, and selects the second beam on the basis of second report information indicating reception results of the second reference signals reported from the terminal apparatus.

(4)

The base station according to any one of (1) to (3), in which a plurality of the second resources corresponding to a plurality of the second beams having irradiation ranges obtained by subdividing an irradiation range of the first beam corresponding to the first resource is arranged in time resources after the first resource.

(5)

The base station according to any one of (1) to (4), in which all the second resources are arranged in time resources after all the first resources.

(6)

The base station according to any one of (1) to (5), in which the number of the second beams having irradiation ranges obtained by subdividing an irradiation range of the first beam is variable.

(7)

The base station according to (1), in which the selection unit transmits the first reference signals respectively using a plurality of the first beams, selecting the first beam on the basis of first report information indicating reception results of the first reference signals reported from the terminal apparatus, receives the second reference signals transmitted from the terminal apparatus in second resources respectively using a plurality of the second beams having irradiation ranges obtained by subdividing an irradiation range of the selected first beam, and selects the second beam on the basis of reception results.

(8)

The base station according to (7), in which the selection unit notifies an adjacent base station of information indicating the second resources and receives the second reference signals in the second resources.

(9)

The base station according to (7), in which the selection unit receives the second reference signals in second resources of a serving base station of the terminal apparatus.

(10)

The base station according to any one of (7) to (9), in which the selection unit multiplexes the first resources and the second resources with the first resources and the second resources of other base stations in a time direction or in a frequency direction.

(11)

The base station according to any one of (7) to (10), in which arrangement of the second resources are individually set to the terminal apparatuses.

(12)

The base station according to any one of (7) to (11), in which a plurality of the second resources is provided for one of the second beam.

(13)

A terminal apparatus including: an acquisition unit configured to acquire, from a base station which selects a second beam appropriate for communication with the terminal apparatus on the basis of reception results of a plurality of the second reference signals transmitted or received using a plurality of the second beams having irradiation ranges obtained by subdividing an irradiation range of a first beam appropriate for communication with the terminal apparatus selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals, and a selection support unit configured to perform processing for supporting selection of the second beam by the base station on the basis of the information indicating the arrangement relationship.

(14)

The terminal apparatus according to (13), in which the selection support unit receives the second reference signals in a plurality of the second resources corresponding to a plurality of the second beams having irradiation ranges obtained by subdividing an irradiation range of the selected first beam with reference to the information indicating the arrangement relationship and reports second report information indicating reception results of the second reference signals to the base station.

(15)

The terminal apparatus according to (14), in which the selection support unit reports first report information indicating reception results of the first reference signals to the base station.

(16)

The terminal apparatus according to (13), in which the selection support unit transmits the second reference signals in a plurality of the second resources corresponding to a plurality of the second beams having irradiation ranges obtained by subdividing an irradiation range of the first beam selected by a serving base station with reference to the information indicating the arrangement relationship.

(17)

A method to be executed by a processor, the method including: selecting a second beam appropriate for communication with a terminal apparatus on the basis of reception results of a plurality of second reference signals transmitted or received using a plurality of the second beams having irradiation ranges obtained by subdividing an irradiation range of a first beam appropriate for communication with the terminal apparatus, selected on the basis of reception results of a plurality of first reference signals transmitted using a plurality of the first beams which are formed by a plurality of antennas and which are set in advance; and notifying the terminal apparatus of information indicating arrangement relationship between a plurality of first resources corresponding to a plurality of the first beams for the first reference signals and a plurality of second resources corresponding to a plurality of the second beams for the second reference signals.

(18)

A method to be executed by a processor, the method including:

acquiring, from a base station which selects a second beam appropriate for communication with a terminal apparatus on the basis of reception results of a plurality of the second reference signals transmitted or received using a plurality of the second beams having irradiation ranges obtained by subdividing an irradiation range of a first beam appropriate for communication with the terminal apparatus, selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals; and performing processing for supporting selection of the second beam by the base station on the basis of the information indicating the arrangement relationship.

(19)

A recording medium in which a program is recorded, the program being a program for causing a computer to function as: a selection unit configured to select a second beam appropriate for communication with a terminal apparatus on the basis of reception results of a plurality of second reference signals transmitted or received using a plurality of the second beams having irradiation ranges obtained by subdividing an irradiation range of a first beam appropriate for communication with the terminal apparatus, selected on the basis of reception results of a plurality of first reference signals transmitted using a plurality of the first beams which are formed by a plurality of antennas and which are set in advance; and a notification unit configured to notify the terminal apparatus of information indicating arrangement relationship between a plurality of first resources corresponding to a plurality of the first beams for the first reference signals and a plurality of second resources corresponding to a plurality of the second beams for the second reference signals.

(20)

A recording medium in which a program is recorded, the program being a program for causing a computer to function as:

an acquisition unit configured to acquire, from a base station which selects a second beam appropriate for communication with a terminal apparatus on the basis of reception results of a plurality of the second reference signals transmitted or received using a plurality of the second beams having irradiation ranges obtained by subdividing an irradiation range of a first beam appropriate for communication with the terminal apparatus, selected on the basis of reception results of a plurality of the first reference signals transmitted using a plurality of the first beams which are formed by a plurality of antennas and which are set in advance; information indicating arrangement relationship between a plurality of first resources corresponding to a plurality of the first beams for first reference signals and a plurality of second resources corresponding to a plurality of the second beams for second reference signals; and a selection support unit configured to perform processing for supporting selection of the second beam by the base station on the basis of the information indicating the arrangement relationship.

(21)

The base station according to any one of the above-described (7) to (12), in which the notification unit notifies the terminal apparatus of information indicating the second resources in which the terminal apparatus is to transmit the second reference signals after the first beam is selected.

(22)

The base station according to any one of the above-described (7) to (12), in which the notification unit notifies the terminal apparatus of information indicating candidates for the second resources in which the terminal apparatus is to transmit the second reference signals before the first beam is selected.

REFERENCE SIGNS LIST 1 system
11 cell
20 core network
30 PDN
100 base station
110 antenna unit
120 wireless communication unit
130 network communication unit
140 storage unit
150 processing unit
151 selection unit
153 notification unit
155 communication control unit
200 terminal apparatus
210 antenna unit
220 wireless communication unit
230 storage unit
240 processing unit
241 acquisition unit
243 selection support unit

The invention claimed is:

1. A base station comprising:
a selector configured to select a second beam, among a plurality of second beams, appropriate for communication with a terminal apparatus on a basis of reception results of a plurality of second reference signals transmitted or received utilizing the plurality of the second beams having irradiation ranges obtained by subdividing an irradiation range of a first beam, among a plurality of first beams, which is appropriate for communication with the terminal apparatus and which is selected on a basis of reception results of a plurality of first reference signals transmitted utilizing the plurality of the first beams which are formed by a plurality of antennas and which are set in advance; and a notifier configured to notify the terminal apparatus of information indicating an arrangement relationship between the plurality of first resources corresponding to the plurality of the first beams for the first reference signals and a plurality of second resources corresponding to the plurality of the second beams for the second reference signals, wherein the selector transmits the first reference signals utilizing each of the plurality of the first beams, selects the first beam on a basis of first report information indicating reception results of the first reference signals reported from the terminal apparatus, transmits the second reference signals respectively utilizing the plurality of the second beams having irradiation ranges obtained by subdividing an irradiation range of the selected first beam, and selects the second beam on a basis of second report information indicating reception results of the second reference signals reported from the terminal apparatus.

2. The base station according to claim 1,
wherein the selector transmits the first reference signals respectively utilizing the plurality of the first beams, transmits the second reference signals respectively utilizing the plurality of the second beams having irradiation ranges obtained by subdividing an irradiation range of each of a plurality of the first beams, and selects the second beam on a basis of second report information indicating reception results of the second reference signals reported from the terminal apparatus.

3. The base station according to claim 1,
wherein the plurality of the second resources corresponding to the plurality of the second beams having irradiation ranges obtained by subdividing an irradiation range of the first beam corresponding to the first resource is arranged in time resources after a first resource.

4. The base station according to claim 1,
wherein all the second resources are arranged in time resources after all the first resources.

5. The base station according to claim 1,
wherein a number of the second beams having irradiation ranges obtained by subdividing an irradiation range of the first beam is variable.

6. The base station according to claim 1,
wherein the selector transmits the first reference signals respectively utilizing the plurality of the first beams, selects the first beam on a basis of first report information indicating reception results of the first reference signals reported from the terminal apparatus, receives the second reference signals transmitted from the terminal apparatus in second resources respectively utilizing the plurality of the second beams having irradiation ranges obtained by subdividing the irradiation range of the selected first beam, and selects the second beam on a basis of reception results.

7. The base station according to claim 6,
wherein the selector notifies an adjacent base station of information indicating the second resources and receives the second reference signals in the second resources.

8. The base station according to claim 6,
wherein the selector receives the second reference signals in second resources of a serving base station of the terminal apparatus.

9. The base station according to claim 6,
wherein the selector multiplexes the first resources and the second resources with the first resources and the second resources of other base stations in a time direction or in a frequency direction.

10. The base station according to claim 6,
wherein arrangement of the second resources are individually set to the terminal apparatuses.

11. The base station according to claim 6,
wherein a plurality of the second resources is provided for one of the second beams.

12. A terminal apparatus comprising:
an acquirer configured to acquire, from a base station which selects a second beam, among a plurality of second beams, appropriate for communication with the terminal apparatus on a basis of reception results of a plurality of second reference signals transmitted or received utilizing the plurality of the second beams having irradiation ranges obtained by subdividing an irradiation range of a first beam, among a plurality of first beams, appropriate for communication with the terminal apparatus selected on a basis of reception results of a plurality of first reference signals transmitted utilizing the plurality of the first beams which are formed by a plurality of antennas and which are set in advance; information indicating an arrangement relationship between a plurality of first resources corresponding to the plurality of the first beams for first reference signals and a plurality of second resources corresponding to the plurality of the second beams for second reference signals, and a selection supporter configured to perform processing for supporting selection of the second beam by the base station on a basis of the information indicating the arrangement relationship, wherein the selection supporter receives the second reference signals in the plurality of the second resources corresponding to the plurality of the second beams having irradiation ranges obtained by subdividing an irradiation range of the selected first beam with reference to the information indicating the arrangement relationship and reports second report information indicating reception results of the second reference signals to the base station.

13. The terminal apparatus according to claim 12,
wherein the selection supporter reports first report information indicating reception results of the first reference signals to the base station.

14. The terminal apparatus according to claim 12,
wherein the selection supporter transmits the second reference signals in the plurality of the second resources corresponding to the plurality of the second beams having irradiation ranges obtained by subdividing an irradiation range of the first beam selected by a serving base station with reference to the information indicating the arrangement relationship.

15. A method to be executed by a processor, the method comprising:

selecting a second beam, among a plurality of second beams, appropriate for communication with a terminal apparatus on a basis of reception results of a plurality of second reference signals transmitted or received utilizing a plurality of second beams having irradiation ranges obtained by subdividing an irradiation range of a first beam, among a plurality of first beams, appropriate for communication with the terminal apparatus, selected on a basis of reception results of a plurality of first reference signals transmitted utilizing the plurality of the first beams which are formed by a plurality of antennas and which are set in advance;

notifying the terminal apparatus of information indicating an arrangement relationship between a plurality of first resources corresponding to the plurality of the first beams for the first reference signals and a plurality of second resources corresponding to the plurality of the second beams for the second reference signals;

transmitting the first reference signals utilizing each of the plurality of the first beams;

selecting the first beam on a basis of first report information indicating reception results of the first reference signals reported from the terminal apparatus;

transmitting the second reference signals respectively utilizing the plurality of the second beams having irradiation ranges obtained by subdividing an irradiation range of the selected first beam; and selecting the second beam on a basis of second report information indicating reception results of the second reference signals reported from the terminal apparatus.

16. A method to be executed by a processor, the method comprising:

acquiring, from a base station which selects a second beam, among a plurality of second beams, appropriate for communication with a terminal apparatus on a basis of reception results of a plurality of second reference signals transmitted or received utilizing the plurality of the second beams having irradiation ranges obtained by subdividing an irradiation range of a first beam, among a plurality of first beams, appropriate for communication with the terminal apparatus, selected on a basis of reception results of a plurality of first reference signals transmitted utilizing the plurality of the first beams which are formed by a plurality of antennas and which are set in advance; information indicating an arrangement relationship between the plurality of first resources corresponding to a plurality of the first beams for first reference signals and a plurality of second resources corresponding to the plurality of the second beams for second reference signals;

performing processing for supporting selection of the second beam by the base station on a basis of the information indicating the arrangement relationship;

receiving the second reference signals in the plurality of the second resources corresponding to the plurality of the second beams having irradiation ranges obtained by subdividing an irradiation range of the selected first beam with reference to the information indicating the arrangement relationship; and reporting second report information indicating reception results of the second reference signals to the base station.

17. A non-transitory computer readable storage medium storing computer executable instruction which when executed by circuitry causes the circuitry to perform a method, the method comprising:

selecting a second beam, among a plurality of second beams, appropriate for communication with a terminal apparatus on a basis of reception results of a plurality of second reference signals transmitted or received utilizing the plurality of the second beams having irradiation ranges obtained by subdividing an irradiation range of a first beam, among a plurality of first beams, appropriate for communication with the terminal apparatus, selected on a basis of reception results of a plurality of first reference signals transmitted utilizing the plurality of the first beams which are formed by a plurality of antennas and which are set in advance;

notifying the terminal apparatus of information indicating an arrangement relationship between a plurality of first resources corresponding to the plurality of the first beams for the first reference signals and a plurality of second resources corresponding to the plurality of the second beams for the second reference signals;

transmitting the first reference signals utilizing each of the plurality of the first beams;

selecting the first beam on a basis of first report information indicating reception results of the first reference signals reported from the terminal apparatus;

transmitting the second reference signals respectively utilizing the plurality of the second beams having irradiation ranges obtained by subdividing an irradiation range of the selected first beam; and selecting the second beam on a basis of second report information indicating reception results of the second reference signals reported from the terminal apparatus.

18. A non-transitory computer readable storage medium storing computer executable instruction which when executed by circuitry causes the circuitry to perform a method, the method comprising:

acquiring, from a base station which selects a second beam, among a plurality of second beams, appropriate for communication with a terminal apparatus on a basis of reception results of a plurality of second reference signals transmitted or received utilizing the plurality of the second beams having irradiation ranges obtained by subdividing an irradiation range of a first beam, among a plurality of first beams, appropriate for communication with the terminal apparatus, selected on a basis of reception results of a plurality of first reference signals transmitted utilizing the plurality of the first beams which are formed by a plurality of antennas and which are set in advance; information indicating an arrangement relationship between a plurality of first resources corresponding to the plurality of the first beams for first reference signals and a plurality of second resources corresponding to the plurality of the second beams for second reference signals;

performing processing for supporting selection of the second beam by the base station on a basis of the information indicating the arrangement relationship;

receiving the second reference signals in the plurality of the second resources corresponding to the plurality of the second beams having irradiation ranges obtained by subdividing an irradiation range of the selected first beam with reference to the information indicating the arrangement relationship; and reporting second report information indicating reception results of the second reference signals to the base station.

* * * * *